United States Patent
Taneda et al.

(10) Patent No.: US 8,171,463 B2
(45) Date of Patent: May 1, 2012

(54) IMAGE PROCESSING APPARATUS AND CONTROL METHOD THEREOF

(75) Inventors: Masakazu Taneda, Kawasaki (JP);
 Toshiyuki Nakazawa, Tokyo (JP);
 Toshihisa Okutsu, Kawasaki (JP);
 Masami Tsunoda, Yokohama (JP);
 Yoshinori Ito, Tokyo (JP); Hideo Asahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1485 days.

(21) Appl. No.: 11/573,258

(22) PCT Filed: Jul. 29, 2005

(86) PCT No.: PCT/JP2005/014373
 § 371 (c)(1),
 (2), (4) Date: Feb. 5, 2007

(87) PCT Pub. No.: WO2006/013953
 PCT Pub. Date: Feb. 9, 2006

(65) Prior Publication Data
 US 2007/0240124 A1 Oct. 11, 2007

(30) Foreign Application Priority Data
 Aug. 6, 2004 (JP) ................................. 2004-231433

(51) Int. Cl.
 *G06F 9/45* (2006.01)
 *G06F 3/00* (2006.01)
 *G06F 15/16* (2006.01)
 *G06F 3/12* (2006.01)
 *G06F 15/00* (2006.01)

(52) U.S. Cl. ........ 717/139; 717/140; 717/146; 719/321; 719/322; 719/323; 709/231; 358/1.1; 358/1.13; 358/1.15

(58) Field of Classification Search .................. None
See application file for complete search history.

(56) References Cited

U.S. PATENT DOCUMENTS

| | | | | |
|---|---|---|---|---|
| 6,266,150 B1 * | 7/2001 | Brossman et al. | .......... | 358/1.15 |
| 6,456,388 B1 | 9/2002 | Inoue et al. | .................. | 358/1.15 |
| 6,628,413 B1 | 9/2003 | Lee | .............................. | 358/1.15 |
| 6,683,696 B1 | 1/2004 | Urie et al. | | |
| 6,747,753 B1 | 6/2004 | Yamamoto | .................... | 358/1.15 |
| 6,885,471 B1 * | 4/2005 | Minowa et al. | ............... | 358/1.15 |
| 7,136,941 B2 * | 11/2006 | Nguyen et al. | .................. | 710/15 |
| 7,142,322 B2 | 11/2006 | Lee | .............................. | 358/1.15 |
| 7,339,688 B1 | 3/2008 | Baba et al. | | |
| 7,616,342 B2 * | 11/2009 | Laman et al. | ................... | 358/1.9 |
| 7,755,786 B2 * | 7/2010 | Foehr et al. | ................... | 358/1.15 |
| 2002/0186393 A1 | 12/2002 | Pochuev et al. | .............. | 358/1.15 |
| 2004/0001218 A1 * | 1/2004 | Christiansen | ................ | 358/1.15 |

(Continued)

FOREIGN PATENT DOCUMENTS

EP 0529818 3/1993

(Continued)

*Primary Examiner* — Isaac Tecklu

(74) *Attorney, Agent, or Firm* — Fitzpatrick, Cella, Harper & Scinto

(57) ABSTRACT

A data processing apparatus has an interpreter environment for dynamically implementing a program constructed based on a command set defined independently of a native command group, in a native environment constructed based on the native command group processed by a processor configuring hardware. The apparatus generates an intermediate data stream in each of a plurality of stages into which an input data stream is divided in interpretation in the native environment and filters the intermediate data stream to generate a filtered data stream in the interpreter environment.

32 Claims, 19 Drawing Sheets

U.S. PATENT DOCUMENTS

| | | |
|---|---|---|
| 2004/0109200 A1 | 6/2004 | Yamamoto .................... 358/1.15 |
| 2004/0111418 A1 | 6/2004 | Nguyen et al. |
| 2004/0218208 A1 | 11/2004 | Akiyoshi et al. ............. 358/1.15 |
| 2005/0002056 A1 | 1/2005 | Lee ............................... 358/1.15 |
| 2005/0088685 A1 | 4/2005 | Lee ............................... 358/1.15 |
| 2006/0262350 A1 | 11/2006 | Lee ............................... 258/1.15 |

FOREIGN PATENT DOCUMENTS

| | | |
|---|---|---|
| EP | 1385089 | 1/2004 |
| JP | 11-53132 | 6/1989 |
| JP | 11-053132 | 2/1999 |
| JP | 11-143656 | 5/1999 |
| JP | 11-282684 | 10/1999 |
| JP | 11-306107 | 11/1999 |
| JP | 2000-510267 | 8/2000 |
| JP | 2001-243034 | 9/2001 |
| JP | 2003-256216 | 9/2003 |
| JP | 2004-093215 | 3/2004 |
| RU | 2138923 | 9/1999 |
| RU | 2208917 | 7/2003 |
| WO | WO 94/14281 | 6/1994 |
| WO | WO 97/43720 | 11/1997 |

\* cited by examiner

F I G. 6B
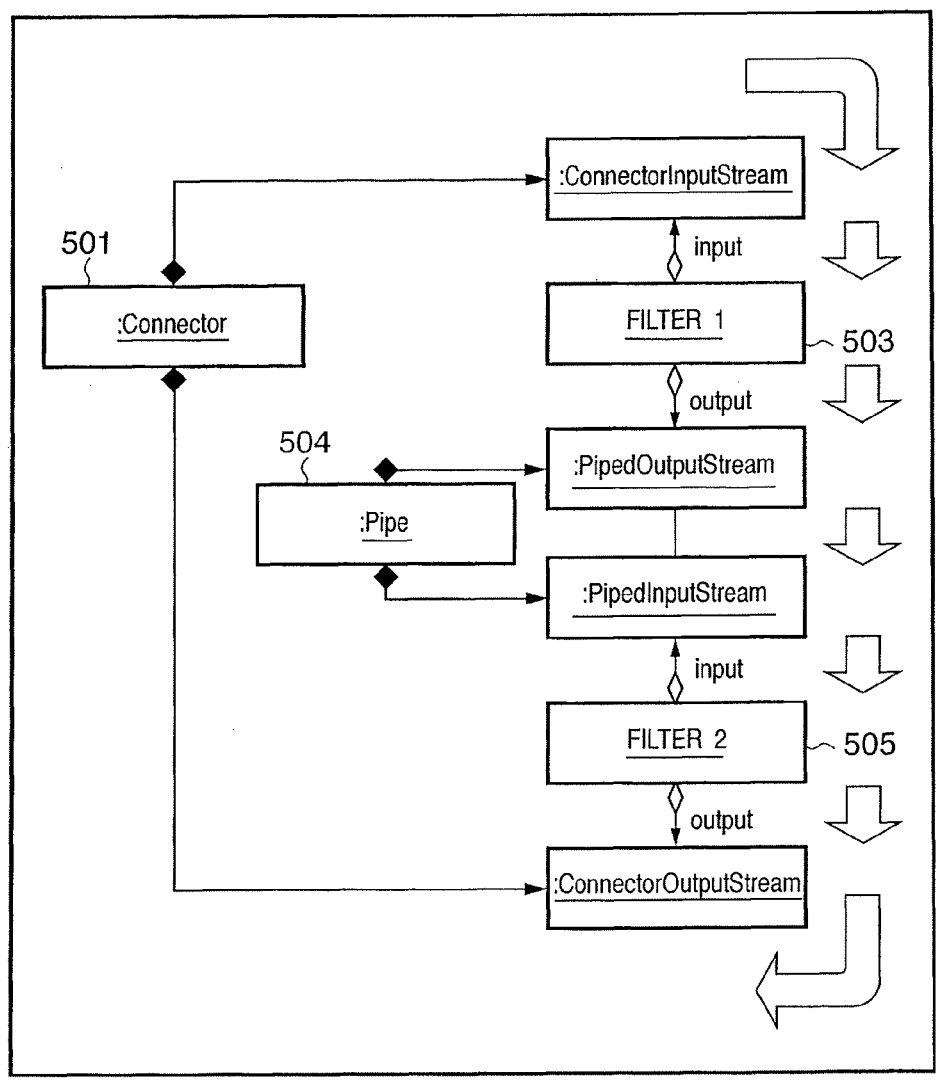

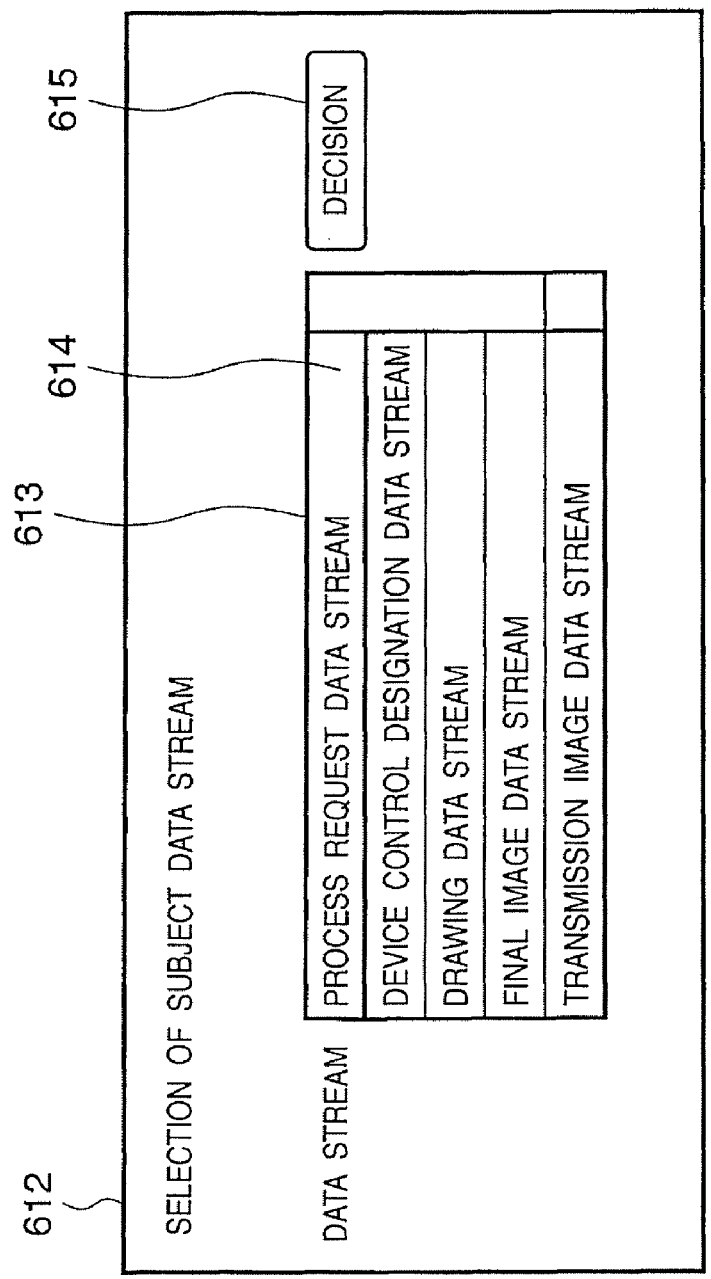

FIG. 11
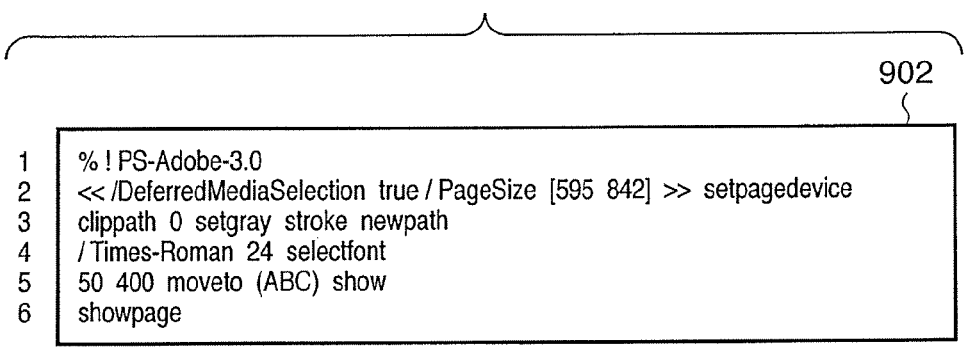
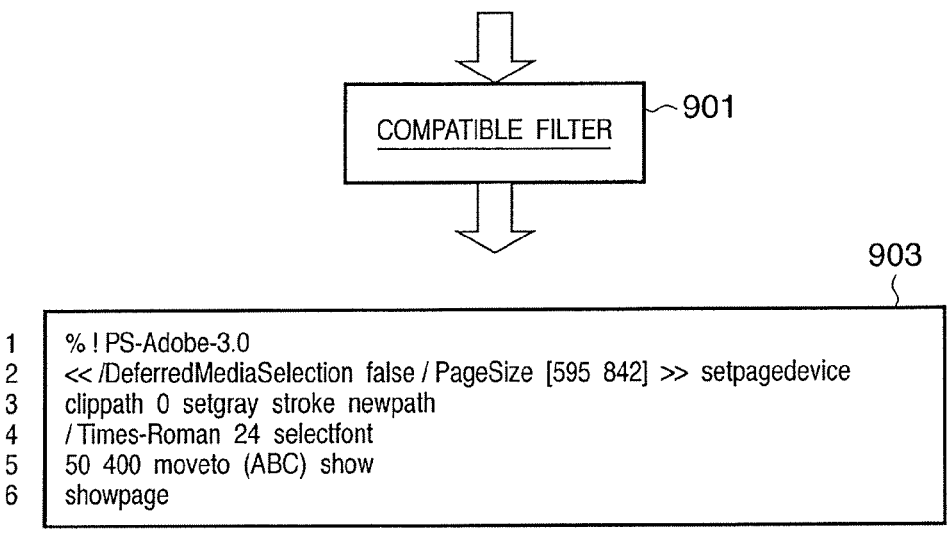

FIG. 15

| | |
|---|---|
| 1301 | PRINT JOB SETUP |
| 1302 | JOB TYPE: ⦿ PRINT  ◯ SECURE PRINT |
| 1312 | COPIES: [1] |
| 1303 | PAGE LAYOUT: [4 PAGES / SHEET ▶] |
| 1304 | PLACEMENT ORDER: [UPPER LEFT TO RIGHTWARD ▶] |
| 1305 | PRINTING METHOD: ◯ ONE-SIDE PRINTING ⦿ BOTH-SIDE PRINTING ◯ BOOKBINDING PRINTING |
| 1306 | STITCH DIRECTION: [WIDE-SIDE STITCH (LEFT) ▶] |
| 1307 | PAPER EJECTION METHOD: ◯ NOT SPECIFIED ⦿ SORT ◯ STAPLE |
| 1308 | PAPER FEEDING PORTION: ⦿ AUTOMATIC ◯ MANUAL TRAY ◯ CASSETTE 1 ◯ CASSETTE 2 |

1313 (preview)

1309 HELP
1310 RETURN TO STANDARD
1311 APPLY

IMAGE PROCESSING APPARATUS AND CONTROL METHOD THEREOF

TECHNICAL FIELD

The present invention relates to an image processing apparatus and a control method thereof.

BACKGROUND ART

Conventionally, software for performing image processing on an image processing apparatus such as a copying machine or an MFP (Multifunction Printer) is mainly constructed as so-called firmware which is static and fixed on an operating system (OS). Even in the case of being internally configured by multiple modules, such firmware is stored in a nonvolatile memory of the apparatus in a state in which the entirety thereof is statically linked to a single load module. On a system startup, it is either loaded from the nonvolatile memory such as a hard disk to a RAM to be implemented or is directly implemented on the nonvolatile memory such as a ROM having the firmware stored therein. In particular, the firmware configuring an incorporating system such as a low-cost image processing apparatus is generally configured not to perform dynamic loading or linking of a partial module for the sake of its economical efficiency and security. This is because cost performance of the apparatus is deteriorated by an amount of memory for storing a symbol table necessary to implement the dynamic link and overhead relating to a process for accessing an address of a symbol. Furthermore, it is attributable to a danger that the additional loading and linking of a sub-module may jeopardize quality and security of the entire system sufficiently evaluated and achieved before linking that sub-module.

Conventionally, development is underway as to the image processing apparatus having a further layer of a software operating environment provided on a real-time OS of the firmware of the incorporating system and supporting dynamic properties of software such as dynamic loading, dynamic linking and dynamic memory operation in the provided software operating environment. The software operating environment capable of adding a module is configured by an interpreter, a set of application programming interfaces (API) and a group of frameworks, and provides a kind of OS or computing platform for the software operating thereon. The interpreter sequentially reads, interprets and implements a series of instruction sequences consisting of the instructions included in a predetermined instruction set. In the case of taking the instruction set as equivalent positioning to the instruction set for a CPU, the interpreter may be called a virtual machine in particular. The set of APIs and the group of frameworks allow access to a resource provided by an actual real-time OS in a lower layer of this software operating environment and various resource groups having hardware resources abstracted for the sake of the software operating in the software operating environment. These resources are an instruction implementing context by means of a processor, a memory, a file system and various kinds of input/output (I/O) including a network interface for instance. The software operating environment can uniquely manage the instruction implementing context on the interpreter independently of a multitask mechanism provided by the CPU and the real-time OS. As for memory management, the software operating environment can similarly provide unique memory management.

The software operating in such a software operating environment is sequentially read and interpreted by the interpreter, and so there is a possibility that it can monitor the instruction sequences in the course of these processes and exclude the operations having an adverse effect on the system. The access to various resources from the software operating in the software operating environment is gained indirectly by way of the group of APIs and group of frameworks provided by the software operating environment. Therefore, there is a possibility of excluding the operations having an adverse effect on the system in the course of this access. Thus, it is very effective to adopt an approach of providing a hierarchy of the software operating environment consisting of the interpreter, group of APIs and group of frameworks inside the firmware in order to partially introduce the dynamic properties of software in the firmware of a low-cost incorporating system which should be statically and fixedly configured (refer to Japanese Patent Laid-Open No. 11-282684 and Japanese Patent Laid-Open No. 2003-256216).

As for the above approach, it is possible, for the sake of implementing the hierarchy of the software operating environment, to adopt a Java (registered trademark) virtual machine as the interpreter and adopt the group of APIs and group of frameworks related to Java (registered trademark). The applicant hereof commercialized a complex machine incorporating a Java (registered trademark) platform inside the firmware of the image processing apparatus in 2003.

Conventionally, an application down-loading type of printer having a network computer is used to download a data file to be printed and an application corresponding to the data file from a computer network to the printer. And there is a known printer incorporating the network computer for starting and running the downloaded application inside the printer and opening the data file and converting it to a raster image to print it. It is also disclosed that a "Java registered trademark) Applet" is used as the application in this case. It is also disclosed that, even in the case of being pushed with a printing data file from a client, the application is pulled from an application server by the printer (refer to Japanese Patent Laid-Open No. 11-53132).

Japanese Patent Laid-Open No. 11-306107 discloses a network communication system for connecting a server apparatus having multiple peripherals, multiple terminal apparatuses having the software operating the peripherals, and at least a database relating the software operating the peripherals to a transmission channel to perform a network communication based on a predetermined communication protocol, wherein the peripherals include a client control portion for requesting and obtaining from the server apparatus current module information corresponding to all or a part of the software operating the peripherals or the module used by the software, and a software distribution agent for distributing an obtained current module to the terminal apparatuses. It is also disclosed that the "Java (registered trademark) Applet" and "Java (registered trademark) application" can be supplied as client-side modules used by the software operating the peripherals in this case.

As for a commercial system, there are the cases where a demand to maintain stability of the entire system having started a normal operation is so strong that a change or a version upgrade of a printer driver and the application is not easily allowed. Amid such constraints of an actual printing environment, a vendor of the printers has a mission to meet various customer demands by solutions on the printer side rather than seeking the solutions on the customer side. For this reason, there is a method of customizing the firmware configuring the printer and printer controller and releasing it so as to meet each customer demand. However, customization of the firmware for meeting each customer demand requires a long development period and a large development cost of the apparatus, and updating of the firmware takes trouble of advanced maintenance by a field engineer. Thus, there remains a problem in promptly meeting each customer demand in terms of cost efficiency.

As for the complex machine incorporating the software operating environment such as the Java (registered trademark) platform, for instance, in the firmware of the incorporating system, it is possible to develop a new apparatus-embedded application independent of the firmware in the software operating environment. It is also possible to access a print function of the apparatus from the Java (registered trademark) application by means of the API. However, the Java (registered trademark) platform is positioned in an embedded application hierarchy inside the firmware, and so it is not possible to divert a print data receiving function and a print server function implemented in the same hierarchy as native embedded applications to the Java (registered trademark) application. To be more specific, it is necessary, for instance, to implement on the Java (registered trademark) side the print server function having various print service protocols for receiving print data by way of a network implemented therein. Thus, it is inefficient in terms of development burden, evaluation burden and the amount of memory on implementation.

In the case of having no hierarchy of the software operating environment in the firmware of the other incorporating system, the entire incorporating system is configured to be capable of the dynamic linking and plug-in so as to have a dynamic configuration. In the case of assuming that a portion requiring the dynamic properties is only a mechanism for flexibly and extendably adding preprocessing before interpreting a received PDL data stream, such a conventional approach is not suited to a low-cost small-scale printer due to increased cost in conjunction with overhead for configuring the entire system as dynamic software and difficulty in quality assurance.

Consequently, there is a proposed technique for improving productivity in customization of PDL printers, whereby a filter portion for performing the preprocessing before interpreting the PDL data stream received by the printer is implemented as flexible and extendable software so as to clearly separate it from implementation of other portions of the printer firmware requiring stability (Japanese Patent Application No. 2004-093215).

In the case of the above Japanese Patent Application No. 2004-093215, it is necessary to perform filtering of the entire print request data stream and so efficient processing is not implemented. To be more specific, the print request data stream received by the image processing apparatus is mainly configured by a device control data stream portion consisting of instructions and orders relating to apparatus control such as a specification of a paper feeding and ejection stage of the printer like JL (Job Language) and a drawing data stream portion consisting of instructions and orders relating to drawing such as PDL. And the filtering is always performed to the data stream including both of them so that efficient processing cannot be performed since the entire process becomes heavy and throughput is reduced. Furthermore, no consideration is given to handling of various process request data streams other than PDL such as a temporary storage of data to the image processing apparatus and handling of various data streams such as sending image data read by the image processing apparatus by e-mail.

DISCLOSURE OF THE INVENTION

An object of the present invention is to eliminate the defects of the conventional techniques.

A feature of the present invention is to provide an image processing apparatus and a control method thereof, the image processing apparatus capable of, by applying a dynamic load or a linkable filter to an inputted data stream, easily implementing various processes for the data stream.

According to an aspect of the present invention, there is provided with an image processing apparatus in a native environment constructed based on a first command group processed by a processor configuring hardware and having an interpreter environment, for dynamically implementing a program constructed based on a second command group defined independently of the first command group, the apparatus comprising:

data stream receiving means for receiving an input data stream including a process request from a client in the native environment;

data processing means for generating an intermediate data stream in each of a plurality of stages into which the input data stream is divided in interpretation in the native environment;

filter means for filtering the intermediate data stream and generating a filtered data stream in the interpreter environment;

interface means for retrieving and writing back the intermediate data stream between itself and the filter means in the native environment; and filter management means for transferring the intermediate data stream retrieved via the interface means in the native environment to corresponding filter means in the interpreter environment and writing back the filtered data stream via the interface means.

Other features and advantages of the present invention will be apparent from the following description taken in conjunction with the accompanying drawings, in which like reference characters designate the same or similar parts throughout the figures thereof.

BRIEF DESCRIPTION OF DRAWINGS

The accompanying drawings, which are incorporated in and constitute a part of the specification, illustrate embodiments of the invention and, together with the description, serve to explain the principles of the invention.

FIGS. 6A and 6B depict diagrams of instance of objects managed by a filter framework constructed in the interpreter environment of the embodiment, where FIG. 6A shows a relation among objects managed by runtime of the filter framework when one filter is in a effective state and FIG. 6B shows the relation among the objects managed by the runtime of the filter framework when two filters are in the effective state;

FIGS. 7A to 7C depict views of describing examples of a user interface for operating the filter framework according to the embodiment;

FIG. 11 is a diagram for describing the process on a drawing data stream performed by a filter according to the embodiment;

FIG. 15 depicts a view showing an example of the user interface for operating a function enhancement filter.

BEST MODE FOR CARRYING OUT THE INVENTION

Preferred embodiments of the present invention will now be described in detail with reference to the accompanying drawings. It should be noted that the embodiments that follow do not limit the invention set forth in the claims and that all combinations of features described in the embodiments are not necessarily essential as means for attaining the invention.

Figure 1:
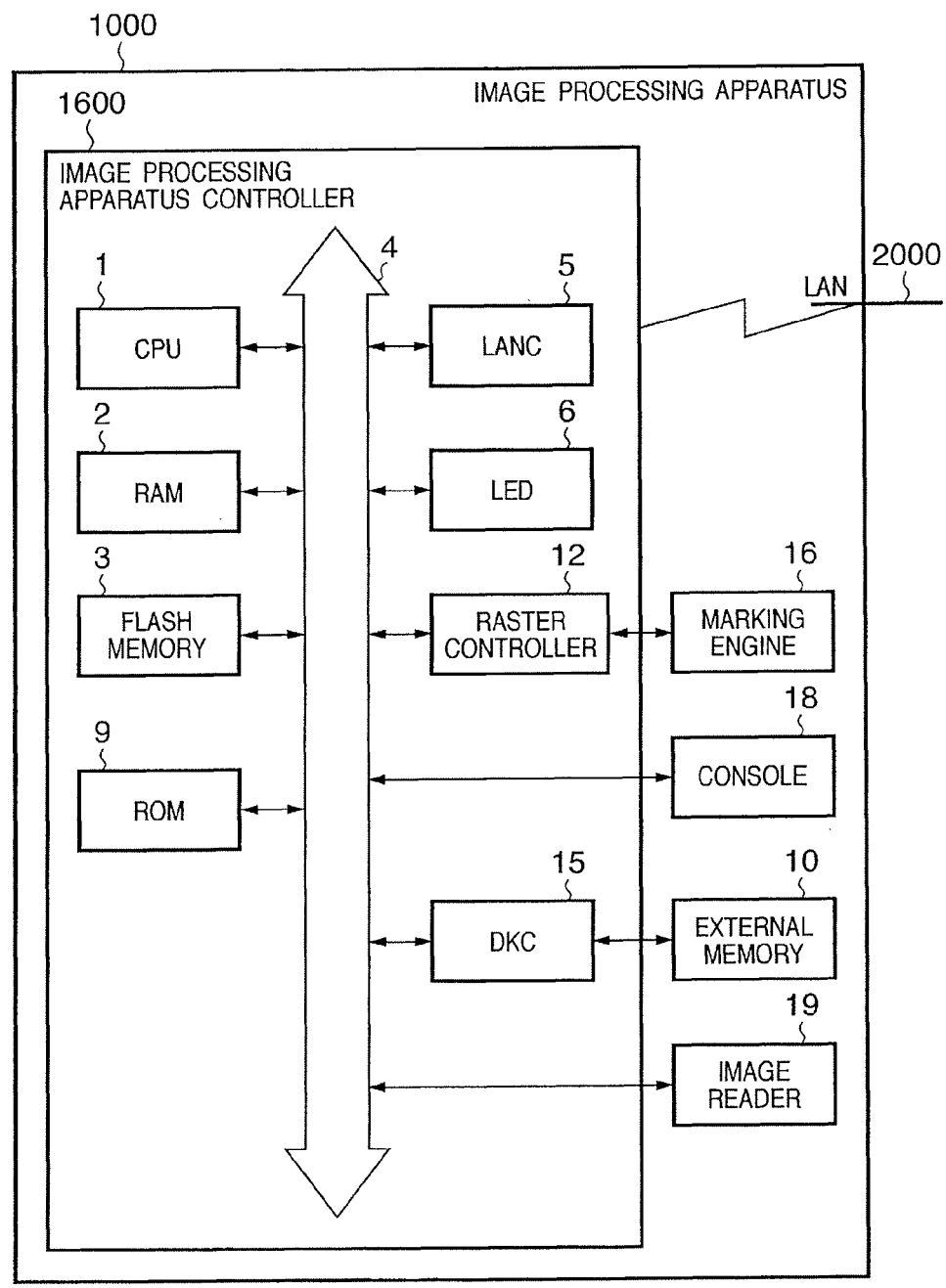
FIG. 1 is a block diagram for describing a hardware configuration of an image processing apparatus according to an embodiment.

FIG. 1 is a block diagram for describing a hardware configuration of an image processing apparatus 1000 according to the embodiment.

The image processing apparatus 1000 has an image processing apparatus controller (hereafter, a controller) 1600, and is configured by devices in control of different control systems. To be more precise, the image processing apparatus 1000 of this embodiment is assumed to be a printer.

A CPU 1 performs a control action based on a control program stored in a rewritable flash memory 3. The CPU 1 uses a predetermined network communication protocol to exert overall control over various data transmission requests such as print data and printer control instructions transmitted from multiple external devices (not shown) such as a host computer connected to a local area network (LAN 2000) via a network controller (LANC) 5 connected to a system bus 4. The CPU 1 also exerts overall control over access to various devices connected to the system bus 4 based on the control program stored in a ROM 9 or the control program or resource data (resource information) stored in an external memory 10 connected via disk controller (DKC) 15. It thereby generates image data with a raster controller 12 based on received print data so as to output the image data to a marking engine (printer engine) 16.

A RAM 2 is used as a temporary storage area of a main memory and a work area of the CPU 1. The flash memory 3 is a rewritable nonvolatile memory storing the control program as well as in the ROM 9. The system bus 4 is used for exchange of the data among the devices included in the controller 1600.

The network controller (LANC) 5 connects the controller 1600 to the LAN 2000. An LED 6 is used as a display for indicating an operational state of the controller 1600, which can indicate various operational states such as an electrical connection status (LINK) between the network controller (LANC) 5 and the local area network (LAN) 2000 and a network communication mode (10Base, 100Base, full-duplex, half-duplex) by a blinking pattern and a color of the LED 6. The external memory 10 holds the control program and various data, and is connected to the controller 1600 via the DKC 15. A hard disk drive, a USB memory and so on are used as the external memory 10. The raster controller 12 generates the image data to be outputted based on the received print data. The marking engine 16 receives the image data from the raster controller 12 and prints it.

An console (operating portion) 18 has buttons for performing operations such as setting an operation mode and canceling the print data of the image processing apparatus 1000, a touch panel displayed being superimposed on a liquid crystal panel, the liquid crystal panel for indicating the operational state of the image processing apparatus 1000 and the display such as the LED. An image reader 19 provides an instruction to read the image data via the console 18 or the local area network 2000 so as to input the read (scan) image data to the image processing apparatus 1000.

The marking engine 16 shown in FIG. 1 utilizes known printing techniques, where preferred examples are an electrophotographic method (laser beam method), an inkjet method and a sublimation (thermal transfer) method for instance.

Figure 2:
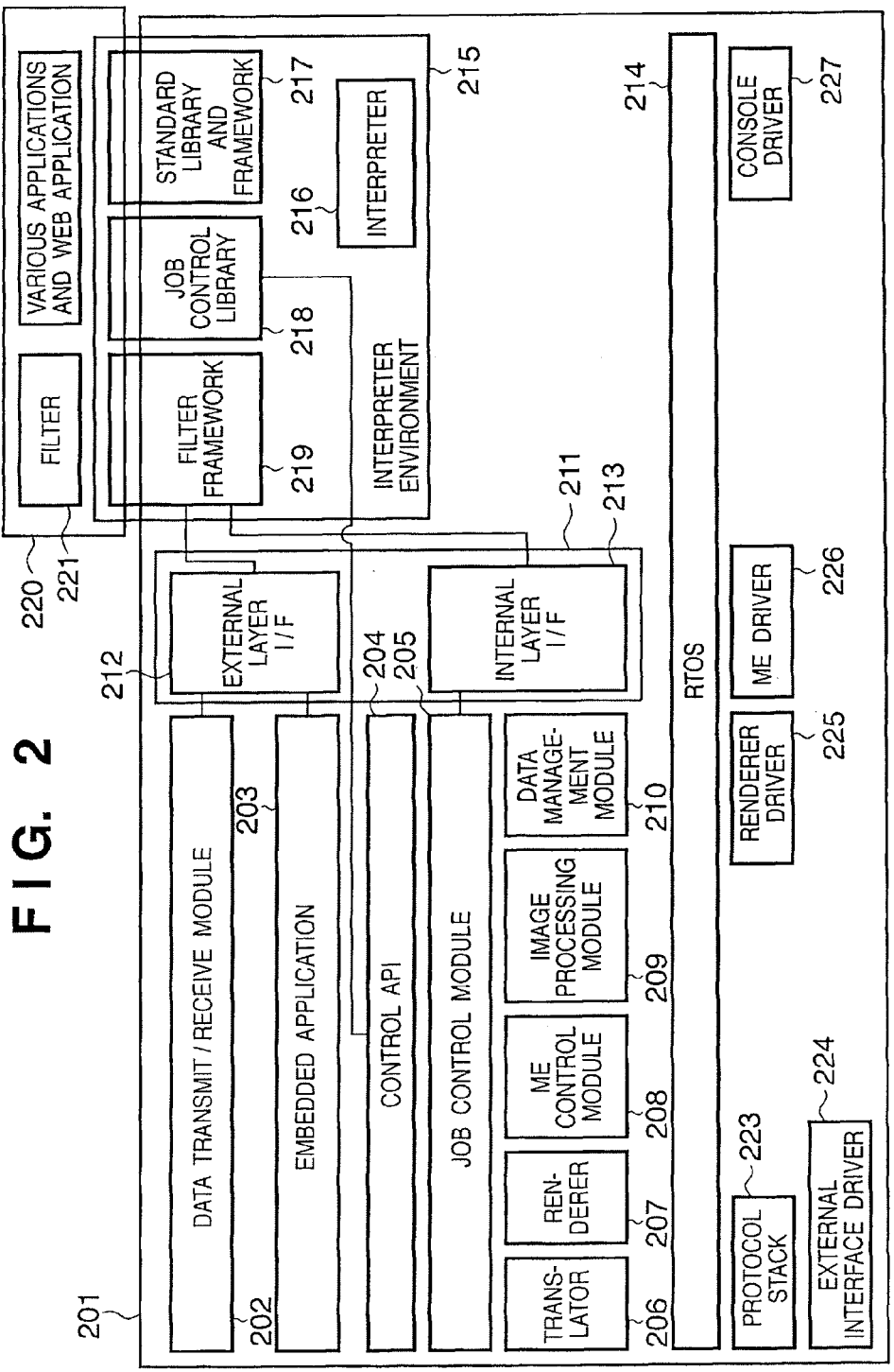
FIG. 2 depicts a hierarchy diagram for describing a software configuration of a controller according to the embodiment.

FIG. 2 is a hierarchy diagram indicating a software configuration of the controller 1600 according to the embodiment. FIG. 2 indicates that a high-order module located in the upper part is dependent on a low-order module located in the lower part. It also indicates that there is a dependency between the modules connected by a line in particular.

A native code portion 201 is a standard portion configuring the firmware of the image processing apparatus 1000, and is directly implemented by the CPU 1. The native code portion 201 is statically linked to a single load module as the firmware when designing the apparatus, and is stored in the flash memory 3 of the image processing apparatus 1000. The firmware is loaded from the flash memory 3 to the RAM 2 on startup of the image processing apparatus 1000, and the CPU 1 reads a code sequentially from the RAM 2 during operation of the image processing apparatus 1000 so as to interpret and process the code. However, no dynamic link is performed on performing that process. The firmware may also be stored in a nonvolatile memory directly readable and accessible by the CPU 1 such as the ROM 9 and have the code sequentially read from the ROM 9 directly by the CPU 1 without loading it in the RAM 2 so as to interpret and implement it.

A data transmit/receive module 202 receives a process request data stream 350 (FIG. 3) from a client, and transmits a transmission data stream 358 (FIG. 3) generated by the controller 1600 to the client. The data transmit/receive module 202 is dependent on a protocol stack 223 via an RTOS (Real-Time OS) 214. Data transmission and reception with the client are physically performed via a network such as Ethernet® and various interfaces such as USB and IEEE 1394, where there is an application protocol prescribed for the sake of making a process request according to each connection mode. The data transmit/receive module 202 has a server function of the application protocols implemented thereon. As for the application protocols for service, there are various specifications, such as LPR, SMB, PAP and NetWare giving only examples of network protocols, and implementation thereof requires huge amounts of development cost and quality evaluation cost. The data transmit/receive module 202 supports multiple protocols consisting of various existing service protocols for each of the multiple interfaces. For the sake of the data transmission and reception, the data transmit/receive module 202 may configure a job queue in the RAM 2 of the image processing apparatus 1000 to have a so-called spool function implemented thereon. In this case, the data transmit/receive module 202 can receive a job request from the client and store it in the queue to release the client even in the case where the job cannot be immediately implemented such as in the middle of implementing another job. The jobs thus stored in the queue are sequentially processed according to a scheduling algorithm when they become implementable.

An embedded application 203 is the embedded application for providing a central function of the image processing apparatus 1000, and provides the service according to the request from the client. In the case where the client is the application and driver software on a host via the LAN 2000, the client generates the process request data stream 350 (FIG. 3) and pass it over to the embedded application 203 via the data transmit/receive module 202. The embedded application 203 divides the process request data stream 350 into a device control designation data stream 351 (FIG. 3) and a drawing data stream 352 (FIG. 3) and passes them over to a job control module 205 via a control API 204 respectively. Or else, it interprets the device control designation data stream 351 (FIG. 3) and instructs the job control module 205 as to the process requested by the client by means of the control API 204 so as to pass the drawing data stream 352 (FIG. 3) thereto.

In the case of an instruction of the client via the console 18 of the image processing apparatus 1000, the embedded application 203 generates the device control designation data stream 351 (FIG. 3) and passes it over to the job control module 205 via the control API 204. Or else, it instructs the job control module 205 as requested by the client by means of the control API 204. A description portion of the control of the apparatus is generally called JL (Job Language), and includes environmental data for specifying an operating parameter relating to interpretation and expansion of drawing data, specification of feeding of transfer paper used for printout, specification of a print mode such as both side printing, specification of a catch tray, specification of a sort (collation) and specification of finishing such as stapling and bookbinding. The drawing data stream is described in PDL and mainly has drawings on each page described.

The control API 204 is the application programming interface for accessing the service provided by the image processing apparatus 1000. One of the major interfaces configuring the control API 204 is the interface for implementing and controlling a print job and passing the device control designation data stream 351 (FIG. 3) and the drawing data stream 352 (FIG. 3) over to the job control module 205.

The job control module 205 controls various image processing jobs provided by the image processing apparatus 1000. The following shows the process of the print job as an example of the image processing job.

The job control module 205 controls the apparatus according to the instructions via the control API 204. Or else, the module 205 interprets the device control designation data stream 351 (FIG. 3) inputted to the job control module 205 via the control API 204 so as to perform the operation. The job control module 205 controls a translator 206, a renderer 207, an ME control module 208, an image processing module 209 and a data management module 210 according to the instructions relating to the control of the apparatus or the description contents of the device control designation data stream 351 via the control API 204. In the case of the print job, the job control module 205 has the drawing data stream 352 (FIG. 3) converted to a display list 355 (FIG. 3) by the translator 206. The display list 355 (FIG. 3) is further converted to an intermediate image data stream 356 (FIG. 3) by the renderer 207. And it is scheduled so that the intermediate image data stream 356 is converted to a final image data stream 357 (FIG. 3) by the image processing module 209 and the final image data stream 357 is sent to the ME control module 208 and printed.

A description will be given, as a further example, as to the operation of reading and transmitting the image data provided by the embedded application 203. If instructed to read and transmit the image data from the console 18, the embedded application 203 instructs the job control module 205 to read and transmit the image data via the control API 204. This instruction of transmission is implemented by the embedded application 203 directly instructing the job control module 205 via the control API 204 or by the embedded application 203 generating the device control designation data stream 351 and passing it over to the job control module 205 via the control API 204. The job control module 205 inputs the image data from the image reader 19 and holds it in the RAM 2 so as to pass it over to the image processing module 209. It is scheduled so that a scan image data stream 360 (FIG. 3) thereby generated is passed over to the embedded application 203. The embedded application 203 converts the passed scan image data stream 360 to a format designated by the console 18 so as to generate a transmission data stream 359 (FIG. 3) and transmit it via the data transmit/receive module 202. Or else, in the case where a destination designated by the console 18 is the built-in external memory 10, the embedded application 203 instructs the job control module 205 to read and store the image data via the control API 204. This instruction is implemented by the embedded application 203 directly instructing the job control module 205 via the control API 204 or by the embedded application 203 generating the device control designation data stream 351 and passing it over to the job control module 205 via the control API 204. The job control module 205 inputs the image data from the image reader 19 and holds it in the RAM 2 so as to pass it over to the image processing module 209. It is scheduled so that the scan image data stream 360 (FIG. 3) generated by the image processing module 209 is stored in the external memory 10 via the data management module 210.

Figure 3:
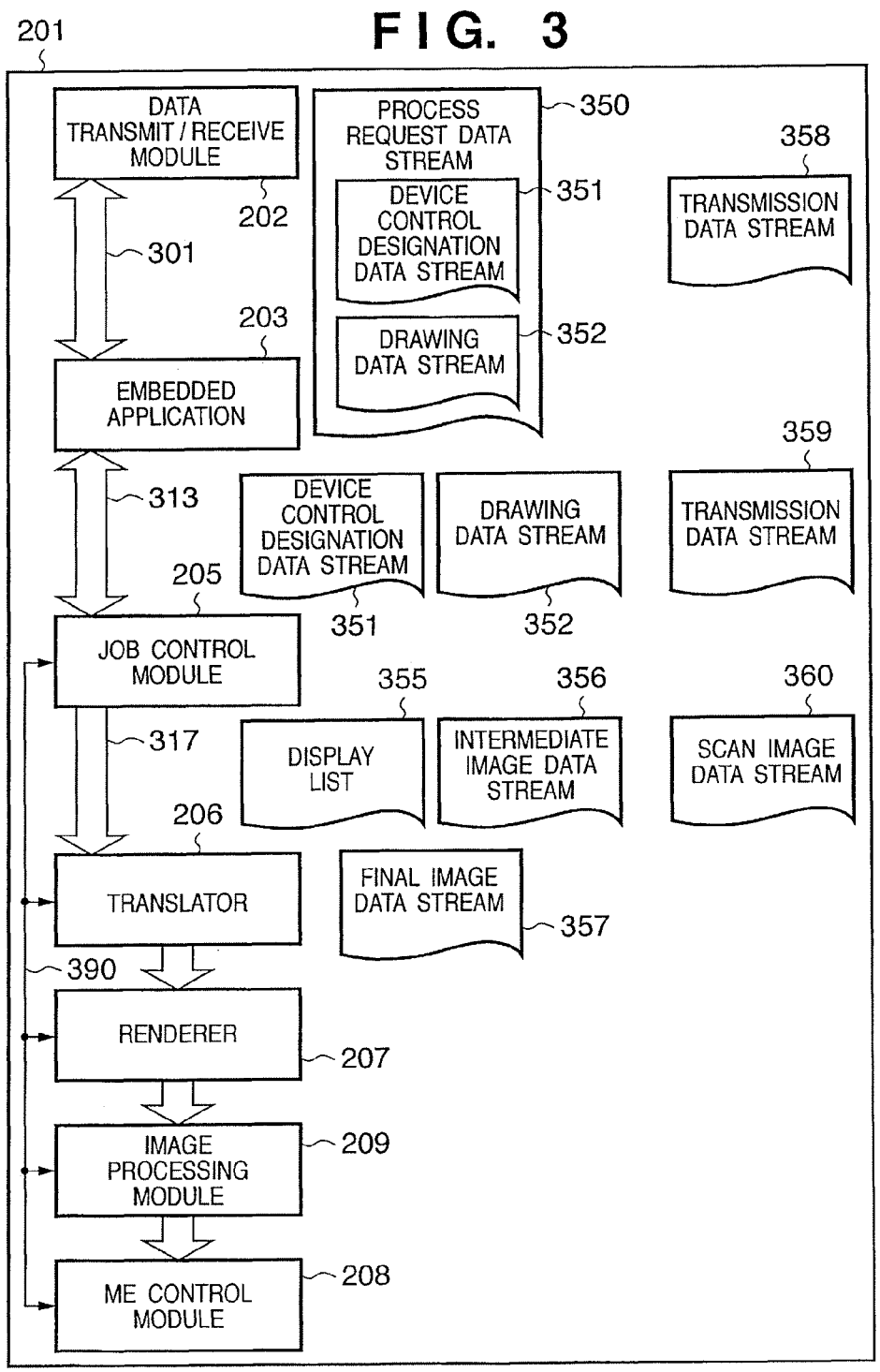
FIG. 3 is a diagram showing a basic data flow among software modules of a controller and data streams existing in each module according to the embodiment.

The translator 206 interprets the drawing data stream 352 (FIG. 3) such as PDL and converts it to an intermediate language for printing suited to a rendering process. Description of the print data in the intermediate language for printing suited to a rendering process is called the display list 355 (FIG. 3). The translator 206 has a different and unique implementation for each of various PDL specifications. Each of the translators converts its PDL to the display list 355 unique to the renderer 207.

The renderer 207 develops the display list 355 to the intermediate image data stream 356 (FIG. 3). The renderer 207 is dependent on a renderer driver 225 via the RTOS 214.

The marking engine (ME) control module 208 controls the marking engine 16 for forming the image on the transfer paper in the image processing apparatus 1000. The ME control module 208 is dependent on an ME driver 226 via the RTOS 214.

The image processing module 209 performs various image processing to the image data of the intermediate image data stream 356 and so on of the image processing apparatus 1000, such as half toning, trapping, density correction and color to monochrome conversion.

The data management module 210 stores and manages in the external memory 10 the data streams such as the intermediate image data stream 356 (FIG. 3) and the final image data stream 357 (FIG. 3) of the image processing apparatus 1000. It is also possible to render the data streams other than the image data streams storable and manageable. A layer I/F 211 exchanges the data streams in the image processing apparatus 1000 with an interpreter environment 215. The layer I/F 211 is roughly divided into an internal layer I/F 213 and an external layer 212 for the sake of labeling in filtering for the data streams.

The external layer 212 passes the process request data stream 350, device control designation data stream 351, drawing data stream 352 and transmission data streams 358, 359 over to the interpreter environment 215 from the data transmit/receive module 202 and embedded application 203, and also passes the data streams processed by a filter 221 over to the data transmit/receive module 202, embedded application 203 and job control module 205.

The internal layer I/F 213 passes the display list 355, intermediate image data stream 356, final image data stream 357 and scan image data stream 360 generated by the job control module 205 exchanging with the translator 206, renderer 207, ME control module 208, image processing module 209, data management module 210 and image reader 19 over to the interpreter environment 215. Furthermore, the I/F 213 passes a job processed by the filter 221 to the job control module 205. Here, it goes without saying that the aforementioned data streams may be exchanged between the interpreter environment 215 and the translator 206, renderer 207, ME control module 208, image processing module 209, data management module 210 and image reader 19 in addition to the job control module 205.

The Real-Time OS 214 is a platform for providing an implementing environment of a native code firmware of the image processing apparatus 1000. The Real-Time OS 214 provides a basic service used for software construction for the sake of the software operating thereon and a service having hardware resources of the image processing apparatus 1000 abstracted. The OS 214 also provides a framework for constructing a device driver for abstracting the hardware of the image processing apparatus 1000 as an interface easily accessible from the software. The functions provided by the RTOS 214 are task management having an instruction implementing context of the CPU1 abstracted, a multitask mechanism for implementing concurrent processing for virtually operating multiple implementing contexts concurrently, inter-task communication (a message queue, a semaphore and so on) for exchanging messages and performing synchronization among tasks, various kinds of memory management, timers and clocks, interrupt management and DMA control. The semaphore means a mechanism for performing synchronization and controlling interruption handling between the processes running in parallel.

The interpreter environment 215 is a software platform based on various interpreter environments, that is, a runtime environment of a Java (registered trademark) platform in this case and configured by adding the group of APIs and the group of frameworks unique to the image processing apparatus 1000 thereto. This software platform provides a software operating environment dynamic to a program described in an interpreter language operating thereon. This interpreter environment includes a portion implemented by a native code (included in the native code portion 201) and a portion implemented as the program described in the interpreter language (included in an interpreter code portion 220 in FIG. 2).

An interpreter 216 sequentially reads the instructions from the instruction sequences described by a predetermined instruction set so as to interpret and implement them. Here, the interpreter 216 is configured by a Java (registered trademark) virtual machine, and the instruction set is a Java (registered trademark) byte code.

A standard API library and a framework group 217 further abstract various abstracted computing resources provided by the RTOS 214 by means of a model unique to the interpreter environment so as to provide the implementing environment for the program operating on the RTOS 214. Here, it is implemented by a standard class library group configuring the Java (registered trademark) platform and the framework of OSGi. The Java (registered trademark) platform provides abstracted functions equivalent to the RTOS 214, such as thread management having the instruction implementing contexts abstracted by the virtual machine, a multithread mechanism for virtually running multiple implementing contexts concurrently to implement concurrent processing, inter-thread communication for exchanging messages and synchronizing between threads, various kinds of highly abstracted memory management (such as collection), timers and clocks, management by exception, file system and network access, and an interface with an external input/output device. The OSGi framework runs multiple Java (registered trademark) applications (services) on a single Java (registered trademark) virtual machine. It also provides the functions of application life cycle management and communication between the applications. The OSGi framework has multiple system services preinstalled thereon. As for the system services prepared, there are a service management service for adding, updating and deleting a new application in the interpreter environment, an Applet viewer service for displaying a Java (registered trademark) class implemented according to an Applet interface on the console of the image processing apparatus and running it to be operable from the console 18, and an HTTP service for running the Java (registered trademark) class implemented according to a Servlet interface as a Web application operable from a browser of the client. In particular, the Java (registered trademark) application implemented according to the Applet interface can interface indirectly with a console driver 227 by way of the API of AWT. OSGi is short for Open Service Gateway Initiative, which means that it is based on the OSGi specifications in this case.

A job control library 218 provides the application programming interface capable of implementing and controlling an image processing job for the program dependent on the control API 204 and running in the interpreter environment.

A filter framework 219 communicates with the embedded application 203 so that, on implementing the job, it can intervene in the multiple data streams of the image processing apparatus 1000 from a filter program implemented in the interpreter environment.

The interpreter code portion 220 is implemented as the software described in the interpreter language interpretable by the interpreter, and includes an API library group configuring the interpreter environment and the program running with a part of the framework group in the interpreter environment. As for the software positioned astride the native code portion 201 and interpreter code portion 220, it is necessary to perform coding for the module interfacing between the respective spaces according to the unique framework and programming model prescribed by the interpreter environment. Here, the programming of a boundary portion is performed according to Java (registered trademark) Native Interface (JNI).

The filter 221 is a program implemented in the interpreter environment. It is implemented according to the framework of the filter framework 219 so as to perform the process for the process request data stream to be processed by the embedded application 203. The protocol stack 223 is incorporated in the framework of the RTOS 214 so as to implement the protocols of a transport layer and thereunder on an external interface controlled by an external interface driver 224 still lower. For instance, in the case of a network interface, the protocols such as TCP/IP and UDP/IP are implemented, and an interface for application programming such as Barkley Socket is provided to the embedded application 203 via the RTOS 214. In the case where the external interface is USB for instance, it implements the protocol such as 1284.4.

The external interface driver 224 drives the hardware providing connections to various interfaces such as the network interface, IEEE 1394, USB, RS232C and Centronics. In the case of the network, it implements the protocols of a physical layer by driving network interface hardware for connecting to the network such as Ethernet (registered trademark).

The renderer driver 225 drives the renderer 207. The renderer 207 is the hardware for developing the display list 355 (FIG. 3) to the intermediate image data stream 356. The renderer 207 may be implemented by the software, and the developed data stream may be the final image data stream 357 (FIG. 3). The marking engine (ME) driver 226 drives the marking engine for forming an image on the transfer paper. The console driver 227 processes an output to the display of the console 18 of the image processing apparatus 1000 and an input event from a key and a touch panel.

FIG. 3 is a diagram showing a basic data flow among software modules of a controller 1600 according to this embodiment and the data streams existing in each module. The modules in common with those shown in FIG. 2 are given the same symbols, and a description thereof will be omitted.

The data transmit/receive module 202 flows the process request data stream 350 consisting of the device control designation data stream 351 and drawing data stream 352 received from the client to the embedded application 203 via a path 301 if not via the filter 221. The path 301 is implemented by the inter-task communication function such as the message queue provided by the RTOS 214 for instance. Other data passing is also the same.

In the case where the client is the application and driver software on the host via the LAN 2000, the client generates the process request data stream 350, and passes it over to the embedded application 203 via the data transmit/receive module 202. The embedded application 203 divides the process request data stream 350 into the device control designation data stream 351 and drawing data stream 352 so as to pass them over to the job control module 205 via the control API 204 respectively. Or else, the application 203 interprets the device control designation data stream 351 and instructs the job control module 205 as to the process requested by the client by means of the control API 204 so as to pass the drawing data stream 352 thereto.

In the case of an instruction of the client via the console 18 of the image processing apparatus, the embedded application 203 generates the device control designation data stream 351 and passes it over to the job control module 205 via the control API 204. Or else, the application 203 instructs the job control module 205 as requested by the client by means of the control API 204. The description portion of the control of the apparatus is generally called JL (Job Language), and includes the environmental data for specifying an operating parameter relating to interpretation and developing of drawing data, specification of feeding of transfer paper used for printout, specification of a print mode such as both side printing, specification of a catch tray, specification of a sort (collation) and specification of finishing such as stapling and bookbinding. The drawing data stream 352 is described in PDL and mainly has the drawings on each page described.

The job control module 205 controls the apparatus 1000 according to the instructions via the control API 204. Or else, the module 205 interprets the device control designation data stream 351 inputted to the job control module 205 via the control API 204 so as to perform the operation. The job control module 205 controls the translator 206, renderer 207, ME control module 208, image processing module 209 and data management-module 210 via a path 390 according to the instructions relating to the control of the apparatus 1000 or the description contents of the device control designation data stream 351 via the control API 204. In the case of the print job, the job control module 205 has the drawing data stream 352 converted to the display list 355 by the translator 206. The display list 355 is converted to the intermediate image data stream 356 by the renderer 207. And it is scheduled so that the intermediate image data stream 356 is converted to the final image data stream 357 by the image processing module 209 so that the final image data stream 357 flows to the ME control module 208 and is printed.

A description will be given, as a further example, as to the operation of reading and transmitting the image data provided by the embedded application 203. If instructed to read and transmit the image data from the console 18, the embedded application 203 instructs the job control module 205 to read and transmit the image data via the control API 204. This instruction is implemented by the embedded application 203 directly instructing the job control module 205 via the control API 204 or by the embedded application 203 generating the device control designation data stream 351 and passing it over to the job control module 205 via the control API 204. The job control module 205 inputs the image data read by the image reader 19 and holds it on the RAM 2 so as to pass it over to the image processing module 209. It is scheduled so that the scan image data stream 360 thereby generated by the image processing module 209 is passed over to the embedded application 203. The embedded application 203 converts the passed scan image data stream 360 into the format designated by the console 18 so as to generate the transmission data stream 359. And the application 203 transmits the transmission data stream 359 as the transmission data stream 359 via the data transmit/receive module 202. Or else, in the case where the destination designated by the console 18 is the built-in external memory 10, the embedded application 203 instructs the job control module 205 to read and store the image data via the control API 204. This instruction is implemented by the embedded application 203 directly instructing the job control module 205 via the control API 204 or by the embedded application 203 generating the device control designation data stream 351 and passing it over to the job control module 205 via the control API 204. The job control module 205 inputs the image data from the image reader 19 via the path 390 and holds it in the RAM 2 so as to pass it over to the image processing module 209. It is scheduled so that the scan image data stream 360 thus generated is stored in the external memory 10 via the data management module 210.

All the above processes are implemented in the native code portion 201 (FIG. 2).

Figure 4:
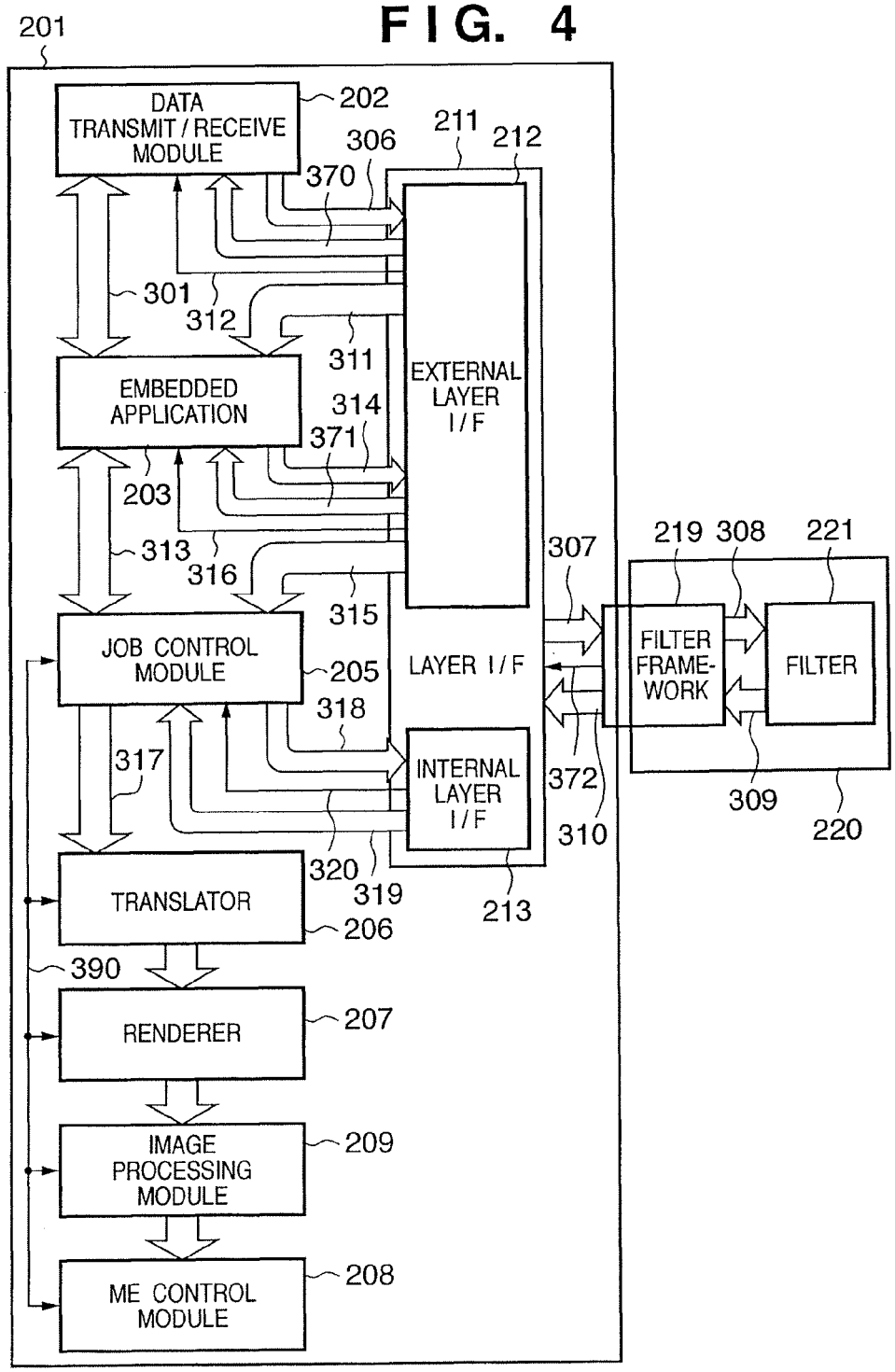
FIG. 4 is a diagram showing the basic data flow among the software modules of the controller and a data flow on filtering according to the embodiment.

FIG. 4 is a diagram for describing the basic data flow among the software modules of the controller 1600 and the data flow on filtering according to the embodiment. The data streams of the modules are the same as those in FIG. 3, and the portions in common with the aforementioned drawings are indicated by the same symbols.

In the case of filtering the data stream, the data transmit/receive module 202 flows the processed data stream to the external layer 212 via a path 306. The path 306 is passed over by the inter-task communication function such as the message queue provided by the RTOS 214 for instance. Other data passing is also possible. The external layer 212 passes the process request data stream 350 as the data stream basically received from the outside of the image processing apparatus 1000 via the LAN 2000, device control designation data stream 351 and drawing data stream 352 having the process request data stream 350 divided in the image processing apparatus 1000, transmission data stream 359 converted and generated by the embedded application, and transmission data stream 358 finally transmitted from the data transmit/receive module 202 over to the interpreter environment 215 in particular, of the layer I/F 211. These data streams may be the ones fetched from the external memory 10 by the data management module 210.

The external layer 212 flows the received data streams to the filter framework 219 via a path 307. A runtime module of the filter framework 219 manages the filter program group 221 implemented in the interpreter environment 215. The filter framework 219 flows the data streams to the filter 221 via a path 308. On the path 308, they are passed over by an inter-thread communication function provided by the interpreter environment 215 for instance. It is the same about the exchange of the data in the interpreter environment 215 below. In the case where a plurality of the filters 221 are placed, the data streams flow among their respective filters, and they are passed over by the inter-thread communication function provided by the interpreter environment 215. The runtime module means the software module required on implementing the program.

The filter 221 performs a predetermined process to the data stream received as input and outputs it. The data stream outputted by the filter 221 flows to the filter framework 219 via a path 309. The filter framework 219 passes the data stream received from the filter 221 over to the external layer 212 via a path 310. Thus, the external layer 212 flows the data stream to the embedded application 203 via a path 311. Or else, it is also possible to have a configuration in which the external layer 212 flows the data stream to the data transmit/receive module 202 via a path 370 so as to flow the data stream to the embedded application 203 via the path 301 as previously described.

Control paths 312 and 372 are the paths for controlling the data stream from the data transmit/receive module 202 to the embedded application 203 according to the state of the filter framework 219. In the case where the filter 221 managed by the filter framework 219 is placed in an effective state, the previously described paths 306 and 307 become effective so that preprocessing is performed by the filter 221. In the case where the filter framework 219 has no effective filter 221 placed, the path 301 becomes effective so that the data stream flows directly from the data transmit/receive stream 202 to the embedded application 203. In this case, it is possible to avoid overhead due to intervention of the filter framework 219 so as to give data processing performance of the image processing apparatus 1000 in a standard state of having no customization performed by the filter 221.

In the case where the embedded application 203 performs the filtering to the data stream, the data stream flows to the external layer 212 via a path 314. The path 314 is passed over by the inter-task communication function such as the message queue provided by the RTOS 214 for instance. Other data passing is also the same. As previously described, the external layer 212 passes the process request data stream 350 as the data stream basically received from the outside of the image processing apparatus 1000 via the LAN 2000, device control designation data stream 351 and drawing data stream 352 having the process request data stream 350 divided in the image processing apparatus 1000, transmission data stream 359 converted and generated by the embedded application, and transmission data stream 358 finally transmitted from the data transmit/receive module 202 over to the interpreter environment 215 in particular, of the layer I/F 211. These data streams may be the ones fetched from the external memory 10 by the data management module 210. The external layer 212 flows the received data streams to the filter framework 219 via the path 307. The runtime module of the filter framework 219 manages the filters 221 implemented in the interpreter environment 215. The filter framework 219 flows the received data streams to the filter 221 via the path 308. The path 308 is implemented by the inter-thread communication function provided by the interpreter environment 215 for instance. It is the same about the exchange of the data in the interpreter environment 215 below. In the case where a plurality of the filters 221 are placed, the data streams flow among their respective filters, and they are passed over by the inter-thread communication function provided by the interpreter environment 215.

The filter 221 performs a predetermined process to the received data stream and outputs it. The data stream outputted by the filter 221 flows to the filter framework 219 via the path 309. The filter framework 219 passes the data stream received from the filter 221 over to the external layer 212 via the path 310. The external layer 212 flows the data stream to the job control module 205 via a path 315. It is also possible to have a configuration in which the external layer 212 flows the data stream to the embedded application 203 via a path 371 so as to flow the data stream to the job control module 205 via the path 313 as previously described.

Control paths 316 and 372 are the paths for controlling the data stream from the embedded application 203 to the job control module 204 according to the state of the filter framework 219. In the case where the filter 221 managed by the filter framework 219 is placed in an effective state, the paths 314 and 307 become effective so that preprocessing is performed by the filter 221. In the case where the filter framework 219 has no effective filter 221 placed, the path 313 becomes effective so that the data stream flows directly to the job control module 205. In this case, it is possible to avoid the overhead due to the intervention of the filter framework 219 so as to give the data processing performance of the image processing apparatus 1000 in the standard state of having no customization performed by the filter 221.

Next, a description will be given as to the case where the job control module 205 performs the filtering to the data stream. In this case, the data stream flows to the internal layer I/F 213 via a path 318. The path 318 is passed over by the inter-task communication function such as the message queue provided by the RTOS 214 for instance. Other data passing is also the same. The internal layer I/F 213 passes the data streams generated by the image processing apparatus 1000 such as the display list 355 generated by having the drawing data stream 352 processed by the translator 206, the intermediate image data stream 356 generated by having the display list 355 processed by the renderer 207, the final image data stream 357 generated by having the intermediate image data stream 356 processed by the image processing module 209, the scan image data stream 360 read from the image reader 19 over to the interpreter environment 215 in particular, of the layer I/F 211. These data streams may be the ones fetched from the external memory 10 by the data management module 210. The internal layer I/F 213 flows the data streams received via the path 318 to the filter framework 219. The runtime module of the filter framework 219 manages the filter 221 implemented in the interpreter environment 215. The filtering process in the interpreter code portion 220 is the same as the aforementioned process, and so a description thereof will be omitted.

The filter framework 219 passes the data stream received from the filter 221 to the internal layer I/F 213 via the path 310. The internal layer I/F 213 flows the data stream to the job control module 205 via a path 319. It is also possible to have a configuration in which the internal layer I/F 213 directly passes it over to the translator 206, renderer 207, image processing module 209, ME control module 208 and data management module 210.

Control paths 320 and 372 are the paths for controlling the data stream according to the state of the filter framework 219. In the case where the filter 221 managed by the filter framework 219 is placed in an effective state, the paths 318 and 307 become effective so that preprocessing is performed by the filter 221. In the case where the filter framework 219 has no effective filter 221 placed, the path 317 becomes effective so that the data stream flows directly to the next module scheduled by the job control module 205. In this case, it is possible to avoid the overhead due to the intervention of the filter framework 219 so as to give the data processing performance of the image processing apparatus in the standard state of having no customization performed by the filter 221. 2

Figure 5:
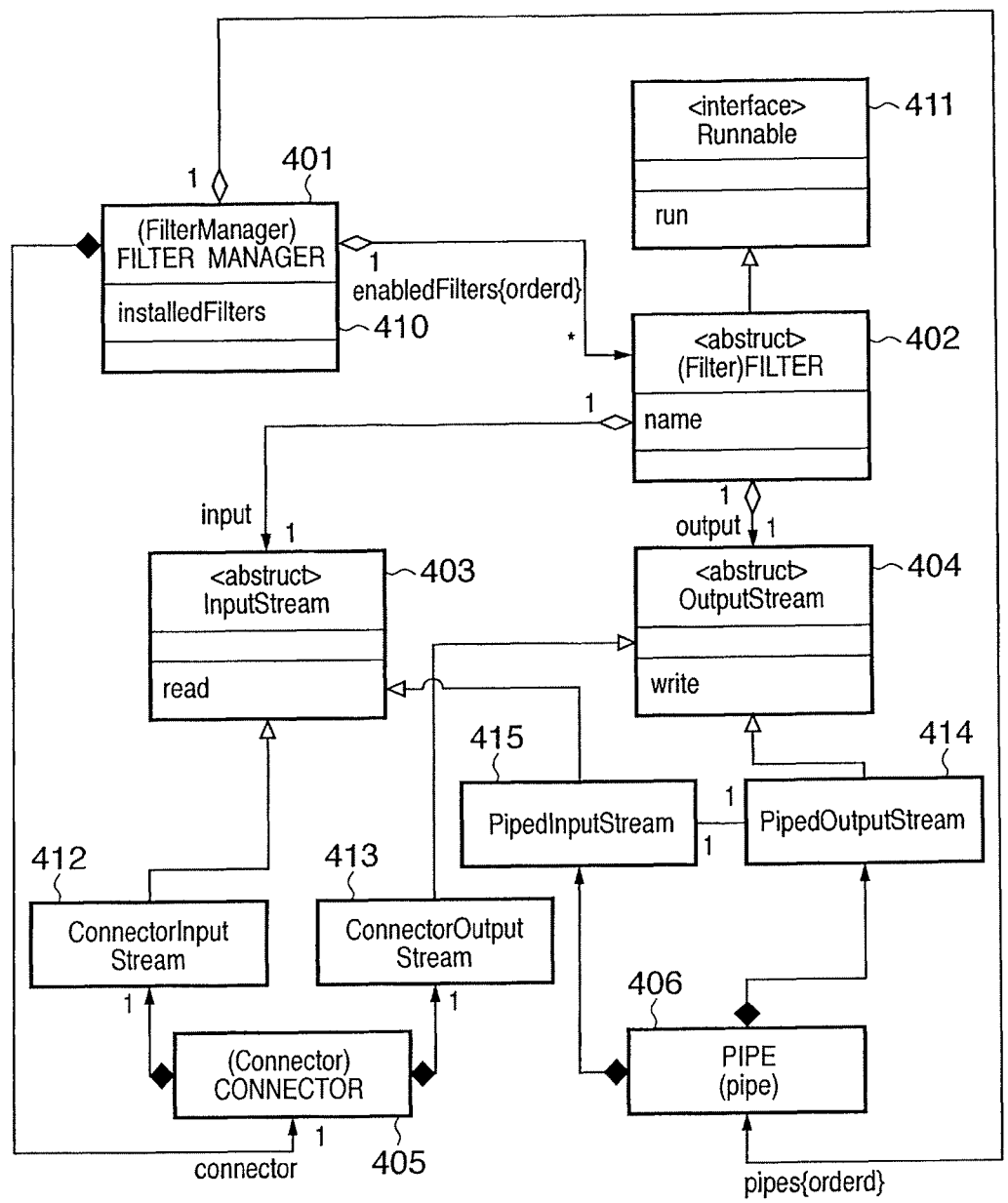
FIG. 5 is a diagram for describing classes of a filter framework constructed in an interpreter environment of the embodiment.

FIG. 5 is a diagram for describing classes of the filter framework 219 constructed in the interpreter environment 215 of the embodiment.

A FilterManager class 401 is a class of an object for implementing the runtime environment of the filter framework 219. The FilterManager class 401 has one connector class 405 object as a composition. It also has a sequenced list consisting of references to a plurality (n) of filter abstract class 402 objects and references to a plurality {(n)–1} of pipe class 406 objects. It also has an installedFilter attribute 410 for managing concrete classes of a plurality of the installed filter classes 402 in the runtime of the filter framework 219.

The filter abstract class 402 is an abstract class for abstracting various filter classes. The filter abstract class 402 has a "name" attribute for indicating a filter name. It also has references to the objects of the class succeeding in an InputStream abstract class 403 as an input attribute. It also has references to the objects of the class succeeding in an OutputStream abstract class 404 as an output attribute. The concrete class of the filter abstract class 402 has a Runnable interface 411 implemented and also has a "run" method. When the object of the FilterManager class 401 generates various instances of the filter abstract class 402 being managed and places them for the filtering process of the data stream, it generates a thread correspondingly to each filter object placed, and implements a run method of the filter object in the implementing context of the thread running in parallel (to be more specific, the filter object is passed to a parameter of a constructor to generate a Java (registered trademark).lang.Thread object and start it). Thus, each individual filter object runs autonomously.

The InputStream abstract class 403 is an abstract class of an input source of the data stream, and has a read method capable of reading the data sequentially on call each time.

The OutputStream abstract class 404 is an abstract class of an output destination of the data stream, and has a write method capable of writing the data sequentially on call each time.

The connector class 405 is a class of objects representing a contact for exchanging the data streams between the object of the interpreter environment and the native code. The connector class 405 has the objects of a ConnectorInputStream class 412 which is a concrete class succeeding in the InputStream abstract class 403 as a composition, and is capable of sequentially reading a data stream 306 flowed from the data transmit/receive module 202 of the native code portion 201 by the read method thereof. The connector class 405 also has the objects of a ConnectorOutputStream class 413 succeeding in the OutputStream abstract class 404 as a composition, and the data stream sequentially written by the write method thereof flows as a data stream to the job control module 205 of the native code portion 201.

The Pipe class 406 is a class of objects used to connect a series of objects of the filter abstract class 402 when performing a plurality of the filtering processes to the data stream. The Pipe class 406 has the respective objects of a PipedOutputStream class 414 succeeding in the OutputStream abstract class 404 and a PipedInputStream class 415 succeeding in the InputStream abstract class 403 as a composition. A PipedOutputStream object 414 and a PipedInputStream object 415 as pipe objects are connected so as to implement the inter-thread communication. To be more specific, the data stream sequentially written to the PipedOutputStream object of a certain pipe object by the write method by a certain filter object is sequentially readable from the PipedInputStream object of that pipe object by the read method by another filter object.

Figure 6A:
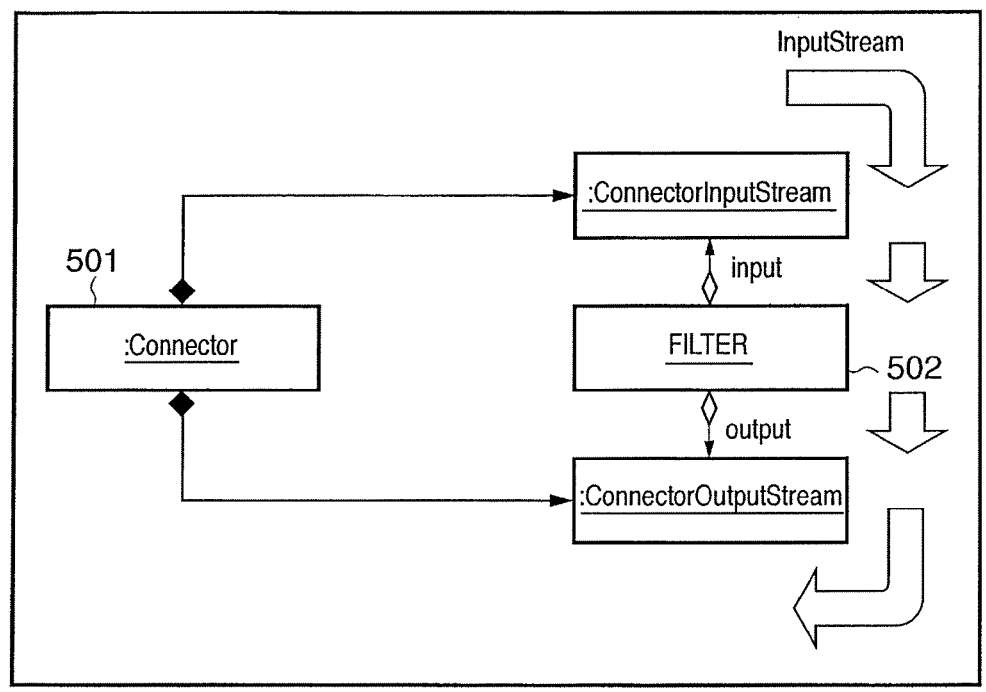

FIGS. 6A and 6B depict views of the objects managed by the filter framework 219 constructed in the interpreter environment 215, where FIG. 6A shows a relation among the objects managed by the runtime of the filter framework 219 when one filter is in the effective state.

A Connector object 501 is an object of the connector class 405. A filter object 502 is an object of the concrete class having concretized the filter abstract class 402. The input attribute of the filter object 502 has a reference to the ConnectorInputStream object of the Connector object 501. The output attribute has the attribute of the ConnectorOutputStream object of the Connector object 501. The filter object 502 performs the filtering process to the data stream read from the ConnectorInputStream object pointed by the "input." It writes the data stream having thus undergone the filtering process to the ConnectorOutputStream object pointed by the "output."

A print data stream is passed over among the objects (broad arrows of FIG. 6A) as described above.

FIG. 6B shows the relation among the objects managed by the runtime of the filter framework 219 when two filters are in the effective state.

A filter 1 object 503 is an object of the concrete class having concretized the filter abstract class 402. The input attribute of the filter 1 object 503 has a reference to the ConnectorInputStream object of the Connector object 501. The filter 1 object 503 performs the filtering process to the data stream read from the ConnectorInputStream object pointed by the input. The output attribute of the filter 1 object 503 has a reference to the PipedOutputStream object of a pipe object 504, and the filter 1 object 503 writes the data stream having undergone the filtering process to the PipedOutputStream object pointed by the output.

The pipe object 504 is an object of the Pipe class 406. The pipe object 504 has the PipedOutputStream object and the PipedInputStream object in a connected state. The data stream passed over by a call of the write method of the PipedOutputStream object of the pipe object 504 is readable as the data stream by a call of the read method of the PipedInputStream object of the pipe object 504.

A filter 2 object 505 is an object of the concrete class having concretized the filter abstract class 402. The input attribute thereof has a reference to the PipedInputStream of the pipe object 504. It performs the filtering process to the data stream read from the pipe object 504 pointed by the input. The output attribute of the filter 2 object 505 has a reference to the ConnectorOutputStream of the Connector object 501, and it writes the data stream having undergone the filtering process to the ConnectorOutputStream of the Connector object 501 pointed by the output.

The print data stream is passed over among the objects (broad arrows of FIG. 6B) as described above. It is also possible to place more filter objects for data stream processing while putting the pipe object 504 in between likewise.

Figure 7A:
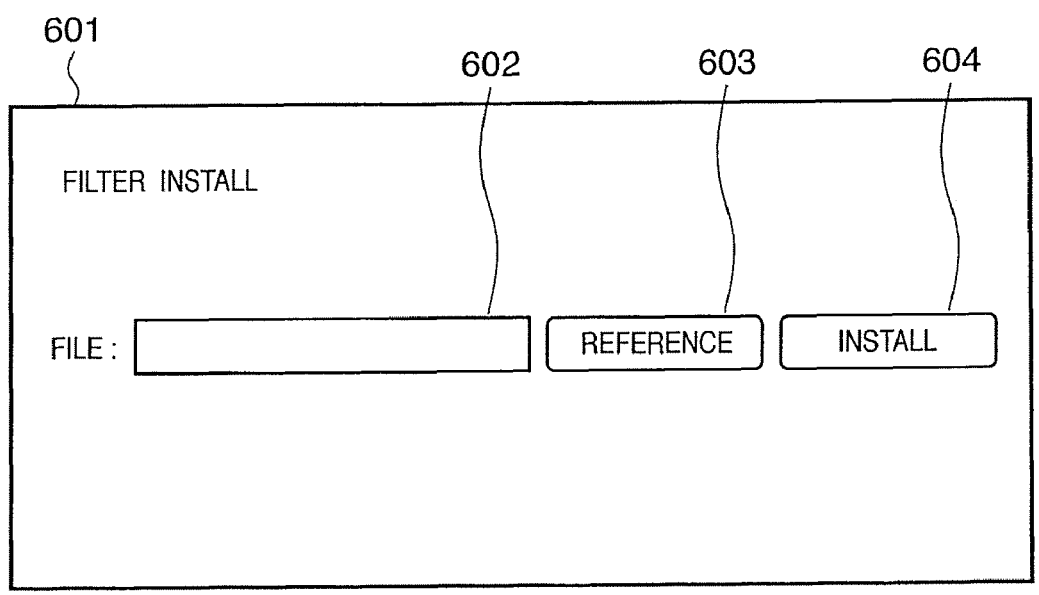
Figure 7B:
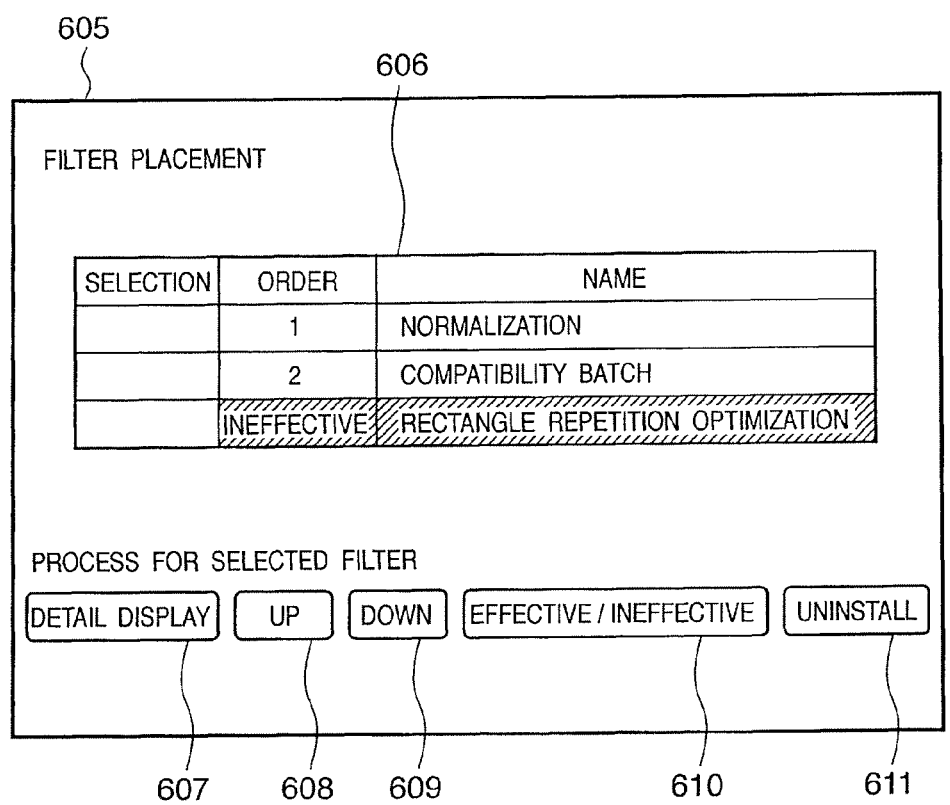

FIGS. 7A to 7C depict views for describing examples of a user interface for operating the filter framework 219 according to this embodiment. The user interface for operating the filter framework is implemented as a Web application (Servlet) by the HTTP service included in a standard library and the framework 217 (FIG. 1), and is operated from a Web browser operating on the client. Or else, it may be implemented as an Applet-type service to be operated from the console 18 of the image processing apparatus 1000.

FIG. 7A depicts the user interface of the client for additionally installing a new filter 221 on the filter framework 219 of the image processing apparatus 1000 of this embodiment. This filter install screen 601 has a file name input field 602, a reference button 603 and an install button 604.

A user inputs to the file name input field 602 a file path of a class file of the filter abstract class 402 to be installed, which is in advance stored in the file system of a client computer.

If the user clicks on the reference button 603 on the client computer, a file selection dialog provided by the Web browser of the client computer is opened so as to browse in the file system of the client computer and select the class file of the filter abstract class 402 to be installed. The file path of the file selected by the user by means of the file selection dialog is automatically inputted to the file name input field 602.

If the user clicks on the install button 604 next, the Web browser of the client computer sends the class file of the file path inputted to the file name input field 602 to the Web application for installing a new filter on standby on the image processing apparatus 1000. The Web application having thus received the class file stores the received class file in the nonvolatile memory 3 of the image processing apparatus 1000. It also loads the class file dynamically on the interpreter environment 215 so as to generate an object instance. And it places the generated filter object most downstream in a list of effective filter sequences managed by a filter framework runtime (if an effective filter object already exists in the filter sequence then, it generates a new pipe object in order to couple the new filter object).

In the case where such a user interface is implemented as the Web application, a specification of a file upload based on an HTML form prescribed by RFC is used when uploading a filter implementation class to the image processing apparatus 1000. Therefore, in this case, the file name input field 602 and reference button 603 are displayed by the Web browser of the client computer, and the install button 604 is corresponding to submit of the form.

In the case of implementing the user interface as the Applet-type service, the screen 601 is displayed on the display of the console 18 of the image processing apparatus 1000. As for the file specified in the file name input field 602, it is possible, in the case where the image processing apparatus 1000 has a removable storage medium, to specify a file path in the removable storage medium. Or else, it is possible to specify by URL a shared file readable and accessible from the image processing apparatus by way of the network by means of file transfer protocols such as HTTP and FTP.

FIG. 7B depicts a view for describing the user interface for placing the filters installed on the filter framework 219 of the image processing apparatus 1000 according to this embodiment.

On this filter placement screen 605, a table 606 displays a list of filter groups installed in the runtime of the filter framework 219. Each line of the table 606 is corresponding to each of the installed filters. A "selection" row of the table 606 has checkboxes arranged, where the filter of the line checked is selected as a subject of the operation mentioned later. An "order" row of the table 606 has "ineffective" indicated therein when the filter is in an ineffective state. In the case where it is in the effective state, the numbers given in ascending order from upstream to downstream in that data stream process are displayed. And a "name" row of the table 606 displays filter name described as a name attribute of the filter object.

Reference numerals 607 to 611 denote the buttons for specifying the operation for the selected filter, and specify the operation for the filter of the line checked in the selection row of the table 606. If the user clicks on a detail display plan 607, detailed information on the filter selected in the table 606 is displayed. The detailed information may include the filter name, version, description, class name, class file name of an install source (a file path or a URL) and date and time of installation.

If an upward button 608 is clicked on, the turn of the selected filter in the filter row is shifted just by one step upstream in the data stream process. If a downward button 609 is clicked on, the turn of the selected filter in the filter row is shifted just by one step downstream in the data stream process. If an effective/ineffective toggle button 610 is clicked on, the selected filter in the effective state is changed to the ineffective state, and is changed to the effective state if in the ineffective state. The filter object rendered ineffective is deleted. However, the filter class 402 (FIG. 5) remains installed and stays under management of the filter framework runtime. If an uninstall button 611 is clicked on, the class file of the selected filter is deleted from the interpreter environment of the image processing apparatus 1000.

FIG. 7C depicts a view for showing an example of the user interface for selecting which data stream is the subject of the filter.

It is possible, in the runup to displaying the filter install screen 601 and filter placement screen 605, to display a subject data stream selection screen 612 and have the user make a selection so as to determine the data stream desired by the user to be installed and set up relating to the filtering process.

A list 613 is a user interface for selecting the data streams existing in the image processing apparatus 1000 in a list format. A field 614 displays the data stream selected from the list 613. A decision button 615 is a button for deciding to install and manage the filter for the data stream specified in the field 614. If the button 615 is pushed, the filter install screen 601 and filter placement screen 605 of the relevant data stream are displayed.

As for another method for selecting the data stream to undergo the filtering process, it is also possible to provide a filter attribute to the filter abstract class 402 and refer to the filter attribute when installing or managing the filter so as to specify a filtering subject data stream.

Figure 8:
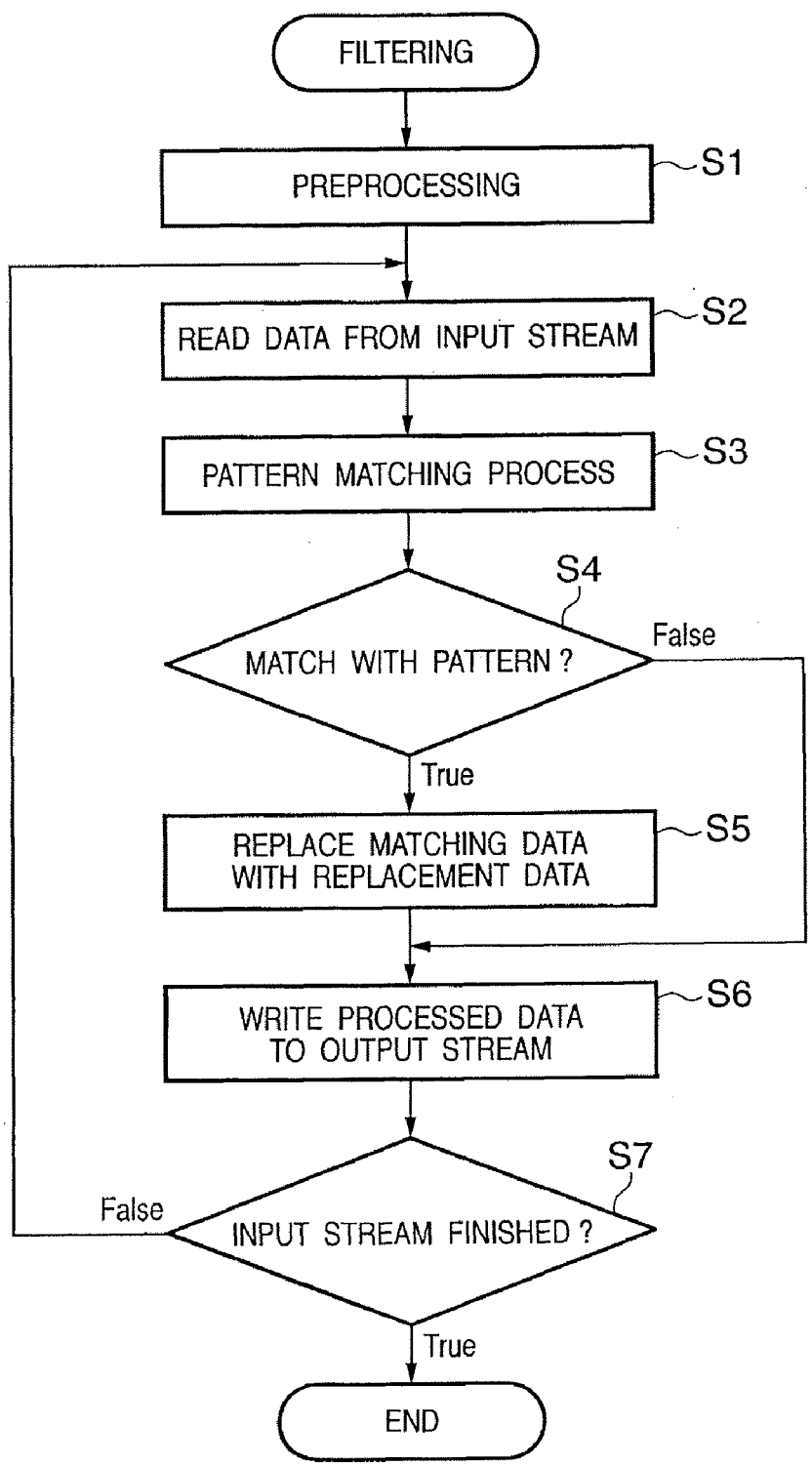
FIG. 8 is a flowchart showing a main procedure of a filtering process according to the embodiment.

FIG. 8 is a flowchart showing a main procedure of the filtering process according to the embodiment.

This procedure is implemented as the run method of a concrete filter class. The filter framework 219 generates the object of an effective filter class and sets up an input stream and an output stream thereof, and then assigns a thread (Thread object) in order to execute the run method of this object. Thus, this procedure is autonomously implemented in parallel processing on each filter object managed by the filter framework 219.

First, necessary preprocessing is performed in a step S1. This preprocessing includes initialization of the attribute used internally by the filter 221, preprocessing for a pattern description used for pattern matching, and a process of wrapping the stream with a modification class (a concrete class of Java (registered trademark). io. FilterInputStream or Java (registered trademark). io. FilterOutputStream) for adding a function of facilitating use of the input stream and output stream (rendering the input stream pre-readable, and expanding buffering to use the system resources effectively, for instance). Next, the data of a necessary amount for a pattern matching process is read from the input stream set to the input attribute in a step S2. And in a step S3, the pattern matching is performed in order to find emergence of a data pattern to be operated by this filter from the inputted data stream. The data pattern to be operated by this filter may be either a fixed data row itself or a description in a formal language such as regular expression. There are various widely known implementations for finding emergence of the data matching with the pattern description out of the data stream. For instance, grep, sed, AWK and Perl are well-known.

The algorithm for efficiently performing the pattern matching is well studied. In the case of a fixed pattern description, there are known methods, such as the method of comparing the respective hash functions of the pattern description and a partial data stream first to determine a complete match only when their hash values match, the Knuth-Morris-Pratt method and the Boyer-Moore method. In the case of the pattern description by the regular expression, there are various known algorithms of which background is a formal language theory such as finite automaton. The relatively recent Java (registered trademark) platform has a class library for handling the regular expression as a standard (Java (registered trademark).util.regex). For instance, in the case where a status changes according to an upstream pattern of the data stream and interpretation of a downstream pattern must be changed according to the changed status, and the required pattern matching is so complicated that the description in the regular expression is difficult, it is possible to write the algorithm for evaluating a characteristic of the pattern itself as a Java (registered trademark) program. Thus, it is possible to implement the pattern matching straightforward no matter how complicated it may be.

Next, in a step S4, results of the pattern matching are determined. In the case where the data matching with the pattern description is found in the data stream, it moves on to a step S5. Otherwise, it moves on to a step S6. In the step S5, the operation according to an objective of this filter is performed to a partial data row of the data stream matching with the pattern description so as to replace it with the result thereof. Next, in a step S6, a processed partial data row (that is, a data row of which monitored pattern did not emerge or a data row including the monitored pattern having the process of the step S5 performed thereto) is written to the output stream. In the step S7, it is determined whether or not the input stream has finished. It finishes in the case of termination. Otherwise, it returns to the step S2 and repeats the procedure.

Figure 9:
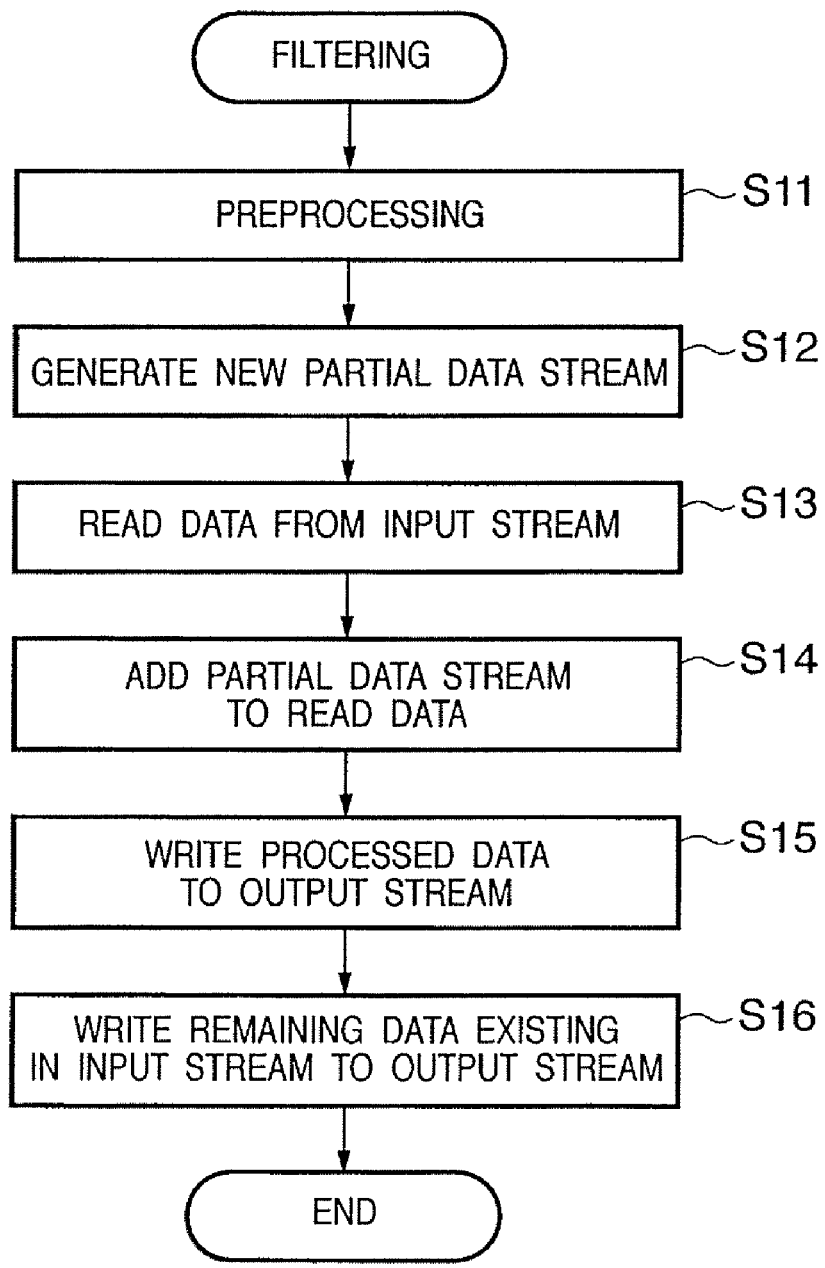
FIG. 9 is a flowchart showing a further example of the procedure of the filtering process according to the embodiment.

FIG. 9 is a flowchart showing a further example of the procedure of filtering according to the embodiment.

This procedure is implemented as the run method of a concrete filter class. The filter framework 219 generates the object of the effective filter class and sets up the input stream and output stream thereof, and then assigns a thread (Thread object) in order to execute the run method of this object. Thus, this procedure is autonomously implemented in parallel processing on each filter object managed by the filter framework.

First, necessary preprocessing is performed in a step S11. This preprocessing includes the initialization of the attribute used internally by the filter, preprocessing for the pattern description used for the pattern matching, and the process of wrapping the stream with a modification class (a concrete class of Java (registered trademark). io. FilterInputStream or Java (registered trademark). io. FilterOutputStream) for adding a function of facilitating the use of the input stream and output stream (rendering the input stream pre-readable, and expanding buffering to use the system resources effectively, for instance). Next, a new partial data stream is generated in a step S12. Next, in a step S13, a predetermined amount of data is read from the input stream set to the input attribute. In a step S14, the partial data row generated in the step S12 is added to the read data stream. Next, in a step S15, the processed partial data row is written to the output stream. In a step S16, the remaining data existing in the input stream is written to the output stream.

Figure 10:
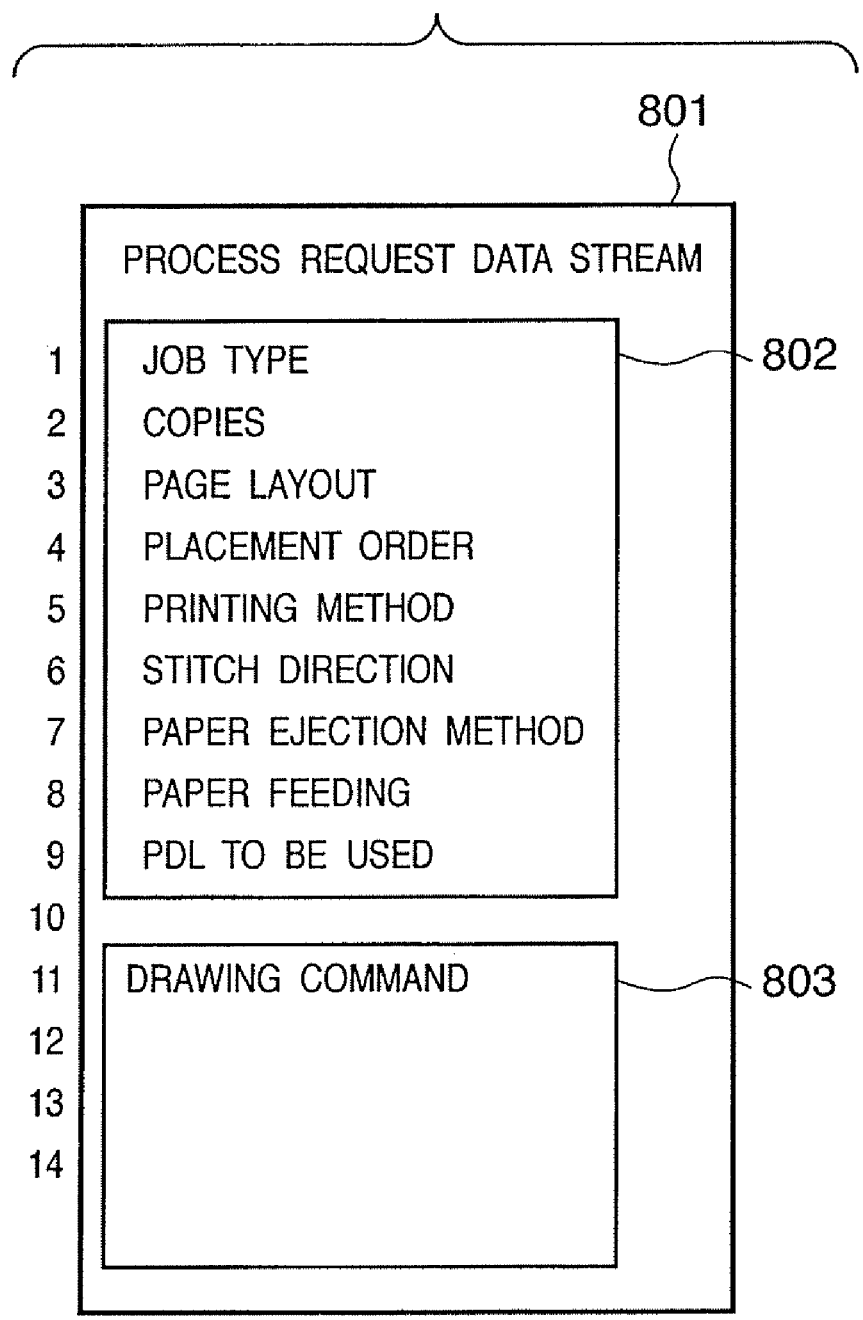
FIG. 10 is a diagram for describing a process request data stream according to the embodiment.

FIG. 10 is a diagram for describing the process request data stream according to the embodiment.

Reference numeral 801 denotes the process request data stream. The client makes a process request of the image processing apparatus 1000 by creating the process request data stream 801 and transmitting it to the image processing apparatus 1000. And the requested process is implemented by having the process request data stream 801 processed by the image processing apparatus 1000. The process request data stream 801 can be roughly divided into a device control designation data stream 802 (equivalent to reference numeral 351 of FIG. 3) and a drawing data stream 803 (equivalent to reference numeral 352 of FIG. 3).

The device control designation data stream portion 802 has designations about the process request of the image processing apparatus 1000 other than the drawing described therein. To be more precise, it is generally known that the following designations are given, which are prescribed by the function of the image processing apparatus 1000. A "job type" attribute on a first line can take values such as "printing," "secure print" and "obtain image," representing various job types of the image processing apparatus 1000. In the case of the process request giving no drawing designation such as "obtain image," the drawing data stream 803 is not generally included in such a process request data stream 801. A "copies" attribute on a second line represents the number of copies of printed matter to be generated. A "page layout" attribute on a third line represents page layout specifications including specifications for imposing multiple pages on a sheet of paper such as "1 page/sheet," "2 pages/sheet" or "4 pages/sheet" or specifications for enlarging one page and dividing it into multiple sheets of paper to print such as a "poster (2×2)" or a "poster (3×3)." A "placement order" attribute on a fourth line can take values such as "upper left to rightward," "upper left to downward," "upper right to leftward" and "upper right to downward," representing placement specifications of the surfaces on the page layout. A "printing method" attribute on a fifth line can take values such as "one-side printing," "both-side printing" and "bookbinding printing," representing the printing method. A "stitch direction" attribute on a sixth line can take values such as a "wide-side stitch (left)," a "wide-side stitch (right)," a "narrow-side stitch (top)" and a "narrow-side stitch (bottom)," representing the directions for stitching multiple sheets of paper on a finishing process. A "paper ejection method" attribute on a seventh line can take values such as a "not specified," "sort," "staple" and "punch holes," representing a finishing method. A "paper feeding" attribute on an eighth line can take values such as an "automatic," a "manual tray," a "cassette" and a "deck" or "plain paper," "heavy paper," "colored paper" and "OHP," representing paper feeding specifications of the paper (transfer paper) as a subject of image formation. A "PDL to be used" attribute on a ninth line is used in the case where the process request contents are the drawing designation, representing the PDL type used for the drawing data stream.

The drawing data stream portion 803 is used in the case where the process request contents are the drawing designation, and the drawing data stream is generally configured by PDLs.

FIG. 11 is a diagram for describing the process for the drawing data stream 803 performed by the filter according to the embodiment.

A compatible filter 901 indicates an object of the filter class of the drawing data stream 803, and performs the process for solving a compatibility problem of the drawing data stream 803 emerging in the input data stream so as to write it to the output data stream. As for the compatibility problem of the drawing data stream 803, a description will be given here as to the problem of the PostScript specification of Adobe as one of the representative PDLs based on differences among vendors in interpretation of the image processing apparatuses implemented by the vendors and an example of the solution thereof.

*In the case where "/DeferredMediaSelection" is true in "setpagedevice" of PostScript, the image processing apparatus of a certain vendor displays a paper request as custom paper handling on the console 18. In the case where it is false, it is implemented, as interpreted, by searching fixed format paper in a range of ±5 from a specified size and following a policy of PostScript if there is none in fixed formats. As for the image processing apparatus of another vendor, in the case where "/DeferredMediaSelection" is true, the fixed format paper is searched in a specified size itself (no range) and is handled as custom paper if there is none in the fixed formats. In the case where it is false, it is implemented by searching the fixed format paper in the range of ±5 and following the policy of PostScript if there is none in fixed formats. Here, an infrastructure environment for a system supplied by a further vendor is constructed on the assumption of a behavior based on the latter interpretation. In this case, the former image processing apparatus handles a print request as the custom paper, and so the console has "no paper" displayed thereon and no printing is performed. Therefore, the vendor of the former image processing apparatus is requested to solve the compatibility problem as inexpensively and as promptly as possible. It is possible to meet such a request at least temporarily by converting the "/DeferredMediaSelection" parameter of setpagedevice emerging in a print request data stream from true to false. The compatible filter 901 is the filter object working to solve such a problem, and performs the pattern matching to setpagedevice with "/DeferredMediaSelection" specified as true from the input data stream, and outputs the transmission data stream replaced by false if it matches.

Reference numeral 902 denotes printing data described in PostScript as an example of the input data stream to the filter. Partial data matching with the above-mentioned pattern emerges on a second line of the printing data. Reference numeral 903 denotes an example of the output data stream outputted by having the input data stream 901 filter-processed by the filter, and is shown as filter-processed printing data of PostScript. In the transmission data stream 903, a character string "true" is changed to "false" in the data of the second line.

Figure 12:
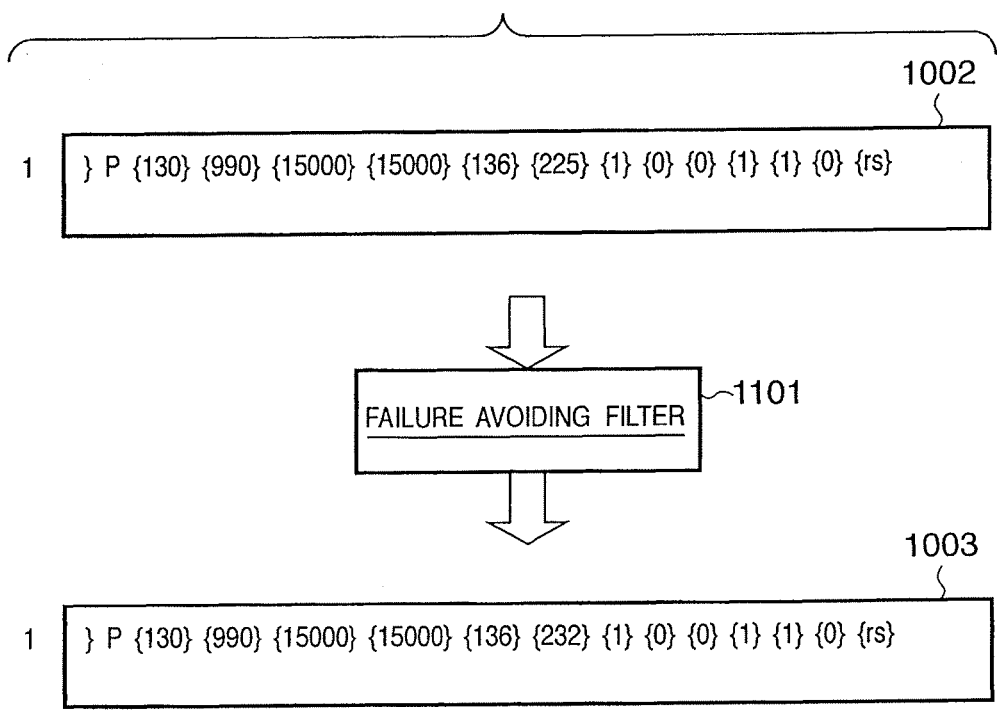
FIG. 12 is a diagram for describing the filtering process on the drawing data stream performed by the filter according to the embodiment.

FIG. 12 is a diagram for describing the filtering process for the drawing data stream performed by the filter according to the embodiment.

The above example used a technique of the pattern matching and replacement of the data stream with the filter in order to solve the compatibility problem based on the differences in the specifications among the image processing apparatuses. It is also possible to use the same technique in order to urgently avoid a failure in the implementation of the image processing apparatus (such as a bug of the firmware). For instance, consideration is given to the case where a release of a certain version of a certain image processing apparatus has a bug wherein a drawing failure occurs unless width of an image specified by an "image area securing order (VDM)" of LIPS (registered trademark) language is a multiple of 8.

Reference numeral 1001 denotes a failure avoiding filter, which finds a pattern for expressing a failure from a LIPS (registered trademark) data stream 1002 (image width of VDM is not a multiple of 8 but "225") and converts it to the data stream denoted by reference numeral 1003 so as to achieve an equivalent function without actualizing the failure. Here, the image width of VDM is converted to "232" as a multiple of 8 and a value larger than "225."

Figure 13:
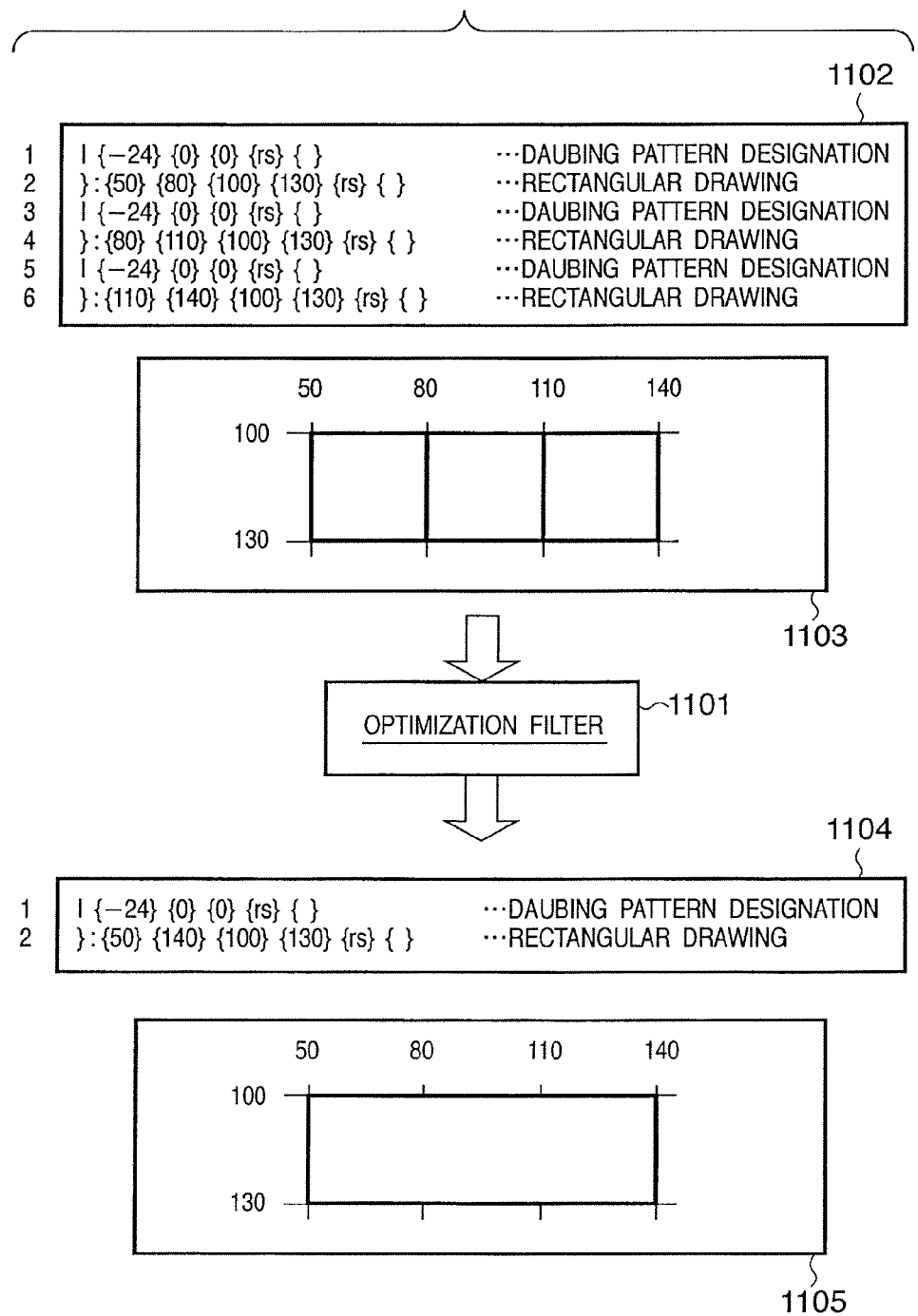
FIG. 13 is a diagram for describing the process on the drawing data stream performed by an optimization filter according to the embodiment.

FIG. 13 is a diagram for describing the process for the drawing data stream performed by an optimization filter according to the embodiment.

An optimization filter 1101 denotes the object of an optimization filter class for the drawing data stream, and reads the input stream to find redundantly described PDL data emerging in the data stream so as to convert it into more efficient data of the same function and write it to the transmission data stream. The PDL data stream generated by the driver of the image processing apparatus tends to essentially include a pattern of a redundant process such as repetition because of a print request system of the client and convenience on the application side. Such a redundant description pattern is recognized as a kind of "idiom" so as to replace it by an equivalent expression of higher efficiency.

Reference numeral 1102 denotes an example of the input data stream inputted to the filter 1101. As denoted by reference numeral 1103, the input data stream 1102 is described to repeat daubing three squares in order to daub a landscape rectangle. Reference numeral 1104 denotes an example of the transmission data stream from the optimization filter 1101. Here, the filter 1101 detects the redundant repetition pattern and rewrites it to one daubed landscape rectangle 1105 which is equivalent thereto.

Figure 14:
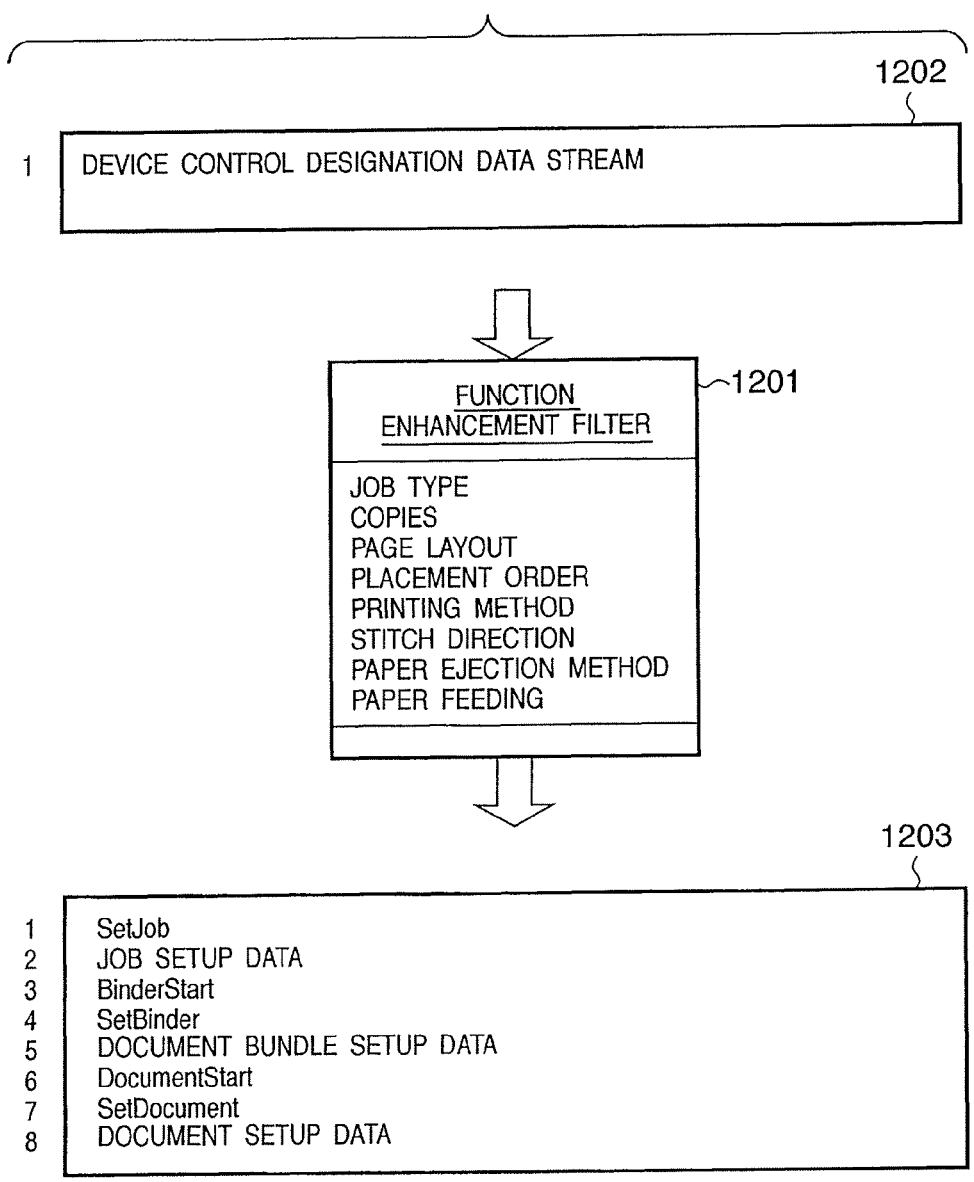
FIG. 14 is a diagram for describing the process on a device control designation data stream performed by a function addition filter according to a first embodiment.

FIG. 14 is a diagram for describing the process for the device control designation data stream performed by a function addition filter according to the embodiment.

Reference numeral 1201 denotes an object example of a function enhancement filter class for the device control designation data stream 351. The function enhancement filter 1201 reads an input data stream 1202 and performs the processes such as data conversion and data addition for adding a new function according to the input data stream so as to write it to the transmission data stream. As an example of the function enhancement, a description will be given as to the case where, when a customer system has a dedicated PDL driver which is not ready for new capabilities of a new image processing apparatus such as both side printing and various kinds of finishing, the new functions of the image processing apparatus 1000 are leveraged by handling of the filter thereof without changing the driver.

The function enhancement filter 1201 has a device control designation setup, as its attribute, for leveraging the new capabilities of the image processing apparatus on which the filter 1201 is in operation. An attribute value of the filter object is also stored in the nonvolatile memory 3 of the apparatus so that the status of the object is stored even if the apparatus is powered off and then restarted. To be more precise, it is prescribed by the functions of the image processing apparatus as previously described.

The input data stream 1202 is the data stream to be inputted to the function enhancement filter 1201 of the print data stream, and is the device control designation data stream 351 wherein the process request data stream generated by a conventional application or the driver of the image processing apparatus and received by the image processing apparatus 1000 is divided in the image processing apparatus.

An output data stream 1203 denotes the data stream sequentially processed and then outputted by the function enhancement filter 1201 of the device control designation data stream. In addition to the simple process request data stream existing in the input data, it has various print job description data for fully using the new functions of the image processing apparatus 1000 inserted therein. A print job description can represent a nested structure, where various attributes like the attribute of the function enhancement filter 1201 can be specified in each of the hierarchies of a job unit, a processing unit such as the finishing having multiple documents put together and an individual document unit.

In the output data stream 1203, "SetJob" in the first line represents a start of setup of the job unit. "Job setup data" in the second line indicates that various job unit setup data exists at this location. "BinderStart" in the third line represents a start of the unit having multiple documents put together. "SetBinder" in the fourth line represents a start of the setup for the unit having multiple documents put together. "Document bundle setup data" in the fifth line indicates that the setup data for the unit having multiple documents put together exists at this location. "DocumentStart" in the sixth line represents a start of the document. "SetDocument" in the seventh line represents a start of the setup of the document unit. "Document setup data" in the eighth line indicates that the setup data having the document as a unit exists at this location.

FIG. 15 depicts a view showing an example of the user interface for operating the function enhancement filter 1201.

The user interface for filter operation is implemented as the Web application (Servlet) by the HTTP service included in the standard library and the framework 217, and is operated from the Web browser operating on the client. Or else, it may be implemented as the applet-type service to be operated from the console 18 of the image processing apparatus 1000.

Reference numeral 1301 denotes a basic operation screen of the function enhancement filter 1201, which can be used to perform the operations of checking and changing a filter object attribute. Reference numeral 1302 is used to manipulate the job type attribute. Reference numeral 1312 is used to manipulate the copies attribute. Reference numeral 1303 is used to set up the page layout attribute. Reference numeral 1304 is used to set up the placement order attribute. Reference numeral 1305 is used to set up the printing method attribute. Reference numeral 1306 is used to set up the stitch direction attribute. Reference numeral 1307 is used to set up the paper ejection method attribute. Reference numeral 1308 is used to set up the paper feeding portion. A help button 1309 is used to display the descriptions of how to use, functions and meaning of the attributes of this filter. A "Return to standard" button 1310 is indicated when returning various attributes to defaults. An application button 1311 is used to apply an attribute value change operation and actually set a new value as a filter object attribute. Reference numeral 1313 denotes a preview icon, which displays frame formats for some important attributes according to the status of the values thereof in order to check various attributes on the screen.

As described above, the first embodiment has the following effects.

(1) A print request receiving server is statically implemented as the firmware, and has the interface for passing the data stream received by the receiving server over to filter software capable of dynamic loading and dynamic linking implemented in an embedded Java (registered trademark) environment. It is thereby possible to clearly separate a stable portion from a dynamic portion so as to prevent an inefficient process such as replacing the entire firmware of the apparatus with dynamic and redundant software or inefficiency such as doubly having it by implementing it on the Java (registered trademark) environment side. The filter framework thus implemented is rational in terms of both cost and development load. Furthermore, it is easy to dynamically add or replace the filter for a delivered apparatus so as to meet the customer needs at lower support cost and more promptly.

(2) As the filter is implemented in a more sophisticated Java (registered trademark) environment, it is easy to implement a sophisticated pattern matching algorithm whereby dynamic memory management generally difficult in an incorporating system is effective. It is designed as highly reusable software in sophisticated modules, and so a design pattern based on an object-oriented paradigm can be easily adopted. It is consequently possible to implement a filter portion of high productivity.

(3) It is possible, by means of the filter, to find the PDL data problematic on a compatibility point with another implementation from the input data stream using the pattern matching so as to change the PDL data properly. This has solved the compatibility problem and failures at low cost. In particular, it is achievable just by the handling closed on the image processing apparatus side without exerting an influence on the system placed in a customer environment, application and driver of the image processing apparatus. In the case where no filter is placed, it is possible, because of the configuration, to avoid the overhead due to the intervention of the filter framework. Therefore, it is possible to maintain original data processing performance of the image processing apparatus even if no filter is placed.

(4) It is possible, by means of the filter flexibly expandable in the Java (registered trademark) environment, to recognize a redundant description pattern as a kind of "idiom" so as to replace it by an equivalent expression of higher efficiency. Thus, printing process performance can be improved while exerting no influence on a main portion of a PDL processing system. As it performs an optimization process closed on the image processing apparatus side, there is no need to convert the system of the customer environment, application and driver of the image processing apparatus. The filter has high productivity and its maintenance including installation is easy, and so optimization can be performed according to a usage form of each individual customer.

(5) It is possible to add the data necessary to leverage the new functions to the filter flexibly expandable in the Java (registered trademark) environment so as to fully use the new functions even in the case of combining it with the system of the customer environment, application and driver of the image processing apparatus not ready for the new functions of the image processing apparatus.

(6) The filter has the user interface for manipulating the setup of additional functions for the filter operating on the firmware as a further layer of a software platform of the firmware in the Java (registered trademark) environment. Thus, there is also a possibility of providing the function enhancement supporting the usage form of each individual customer.

(7) It is possible to perform an optimum filtering process to each of a device control data stream portion consisting of the instructions and orders relating to apparatus control and the drawing data stream portion consisting of the instructions and orders relating to the drawing such as PDL.

[Second Embodiment]

Figure 16:
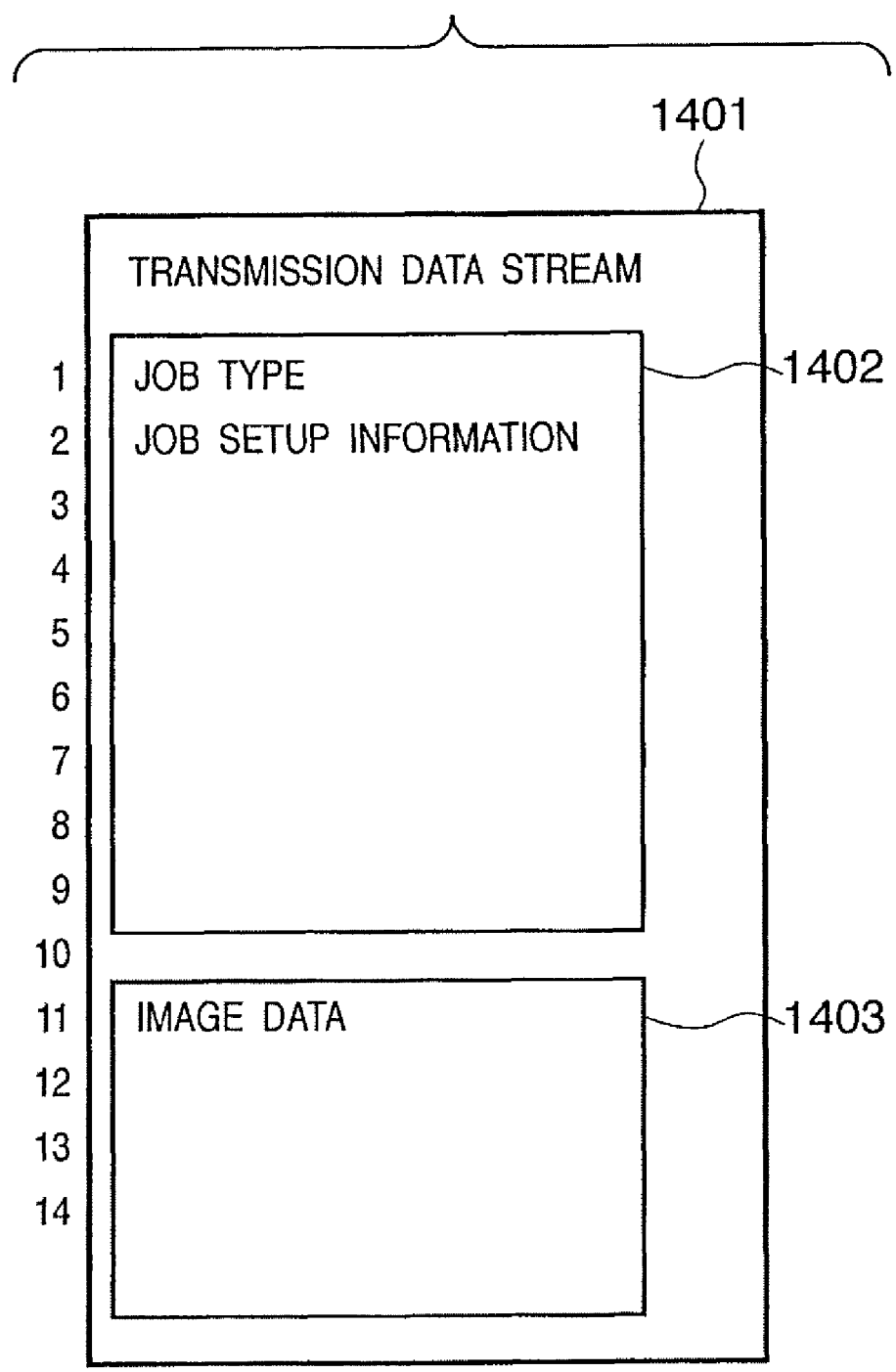
FIG. 16 is a diagram for describing a transmission data stream according to a second embodiment of the present invention.

FIG. 16 is a diagram for describing a transmission data stream 1401 according to a second embodiment of the present invention. The hardware configuration and software configuration relating to the second embodiment are the same as those in FIGS. 1 to 4 previously described, and so a description thereof will be omitted.

The image processing apparatus 1000 transmits the image data and so on to a destination designated by the client according to the process request from the client. In that case, the image processing apparatus 1000 generates the transmission data stream 1401 and transmits it from the data transmit/receive module 202. The transmission data stream 1401 can be roughly divided into a data stream portion 1402 having the job type of the transmission data stream listed therein and an image data stream 1403. The data stream portion 1402 has the information other than the image data itself described therein. The format of the data stream portion 1402 is prescribed by the functions of the image processing apparatus 1000. When performing a data transmission process, the data stream portion 1402 is added to the image data by the job control module 205 or the embedded application 203, and is transmitted as the transmission data stream from the data transmit/receive module 202. The image data stream portion 1403 is generated by having the scan image data stream 360 (FIG. 3) inputted from the image reader 19 processed by the image processing module 209. Here, it is possible, as previously described, to filter-process each of the transmission data stream 1401, data stream portion 1402 and image data stream 1403.

According to the second embodiment described above, the optimum filter process is possible as to each of the scan image data stream 360, image data stream and transmission data stream 359 existing in the image processing apparatus.

[Other Embodiment]

As for the data streams existing in the image processing apparatus other than the above, there are the display list 355 generated by having PDL processed, the final image data stream 357 finally generated on the image processing apparatus and the intermediate image data stream 356 generated for the sake of generating the final image data stream 357 and so on. They have their respective formats prescribed by the functions of the image processing apparatus. It is possible to perform the optimum filtering process to each of the data streams in the same configuration as previously described.

It is also possible to configure the function enhancement filter for finding emergence of a specific character string pattern from character string data of a printing subject rather than control data in the print data stream, and when matching with the specific character string pattern, generating the control data equivalent to that character string to replace or insert it. In this case, when the customer inputs the specific character string as text, for instance, by using an application such as a word processor and prints it by way of an ordinary driver of the image processing apparatus, it is possible, for instance, to convert the specific character string to an instruction sequence such as a vector drawing instruction for drawing the image corresponding to it (a logo, a mark or a watermark) in the filter on the image processing apparatus side.

In the above embodiment, a virtual machine environment of Java (registered trademark) is used as the interpreter environment inside the firmware. However, the present invention is not limited thereto. Even in the case of configuring it by incorporating the interpreter environment such as another script language into the firmware, it can have the same effects such as dynamic filter addition and separation of the firmware portion.

There exist many other interpreter environments capable of high-efficiency development such as object-orientation, which can be used to obtain the same effects as to filter productivity and so on. In particular, alternatives such as sed, AWK and Perl are also suited to the processing of the data stream based on the pattern matching.

[Other Embodiment]

The above described the embodiments of the present invention in detail. The present invention is applicable to the system configured by multiple devices, and is also applicable to the apparatus configured by one device.

The present invention includes the cases where the program of the software for implementing the functions of the aforementioned embodiments is supplied to the system or the apparatus directly or remotely so that the computer of the system or the apparatus reads and implements the supplied program code so as to achieve it. In that case, the form does not have to be the program if it has the functions of the program. Therefore, the present invention is also implemented by the program code itself installed on the computer for the sake of implementing functional processing of the present invention on the computer. To be more specific, the present invention includes the computer program itself for implementing the functional processing of the present invention. In that case, the program may be in any form if it has the functions of the program, such as an object code, a program implemented by the interpreter or script data supplied to the OS.

A storage medium for supplying the program may be a floppy (registered trademark) disk, a hard disk, an optical disk, a magnet-optical disk, an MO, a CD-ROM, a CD-R, a CD-RW, a magnetic tape, a nonvolatile memory card, a ROM or a DVD (DVD-ROM, DVD-R). As for another method of supplying the program, it can be supplied by connecting to a homepage on the Internet by using the browser of the client computer and downloading the computer program itself of the present invention or a compressed file including an automatic install function from the homepage to the storage medium such as a hard disk. It can also be implemented by dividing the program code configuring the program of the present invention into multiple files and downloading the respective files from different home pages. To be more specific, claims of the present invention include a WWW server for downloading to multiple users the program files for implementing the functional processing of the present invention on the computer.

It is also possible to encrypt the program of the present invention and store it in the storage medium such as a CD-ROM to distribute it to the users, have key information for decrypting it downloaded to the user meeting predetermined conditions from the homepage via the Internet, and implement the encrypted program by using the key information so as to install and implement it on the computer.

The functions of the aforementioned embodiments are implemented by having the read program implemented by the computer. The aforementioned functions of the embodiments can also be implemented by the processing of having a part or all of the actual processes performed by the OS and so on operating on the computer based on the instructions of the program.

Furthermore, the functions of the aforementioned embodiments are implemented, after having the program read from a recording medium written to the memory provided to a function enhancement board inserted into the computer or a function enhancement unit connected to the computer, by the processing of having a part or all of the actual processes performed by the CPU and so on provided to the function enhancement board or the function enhancement unit based on the instructions of the program.

As many apparently widely different embodiments of the present invention can be made without departing from the spirit and scope thereof, it is to be understood that the invention is not limited to the specific embodiments thereof except as defined in the appended claims.

Claim Pf Priority

This patent application claims priority from Japanese Patent Application No. 2004-231433 filed on Aug. 6, 2004, which is hereby incorporated by reference.

The invention claimed is:

1. An image processing apparatus in a native environment constructed based on a first command group processed by a processor configuring hardware and having an interpreter environment, for dynamically implementing a program constructed based on a second command group defined independently of the first command group, the apparatus comprising:
a data stream receiving unit constructed to receive an input data stream including a device control designation data stream for giving a control designation to the image processing apparatus and a drawing data stream for giving a drawing designation to the image processing apparatus in the native environment;
a data processing unit constructed to divide the input data stream in the native environment into the device control designation data stream and the drawing data stream and to generate an intermediate data stream;
a filter unit constructed to filter the intermediate data stream and to generate a filtered data stream in the interpreter environment;
an interface unit constructed to retrieve and write back each of the device control designation data stream and the drawing data stream in the native environment; and
a filter management unit constructed to transfer each of the device control designation data stream and the drawing data stream of the intermediate data stream retrieved via the interface unit in the native environment to a corresponding filter unit in the interpreter environment and to write back the filtered data stream via the interface unit.

2. The image processing apparatus according to claim 1, further comprising:
a transmission unit constructed to transmit the intermediate data stream processed by the filter unit to an information processing apparatus.

3. The image processing apparatus according to claim 1, wherein a client is incorporated into one of an information processing apparatus connected via a network and the image processing apparatus.

4. The image processing apparatus according to claim 1, wherein the intermediate data stream further includes an intermediate image data stream generated by processing the device control designation data stream and the drawing data stream, and a final image data stream generated by processing the intermediate image data stream.

5. The image processing apparatus according to claim 1, wherein the filtering by the filter unit includes a process of adding a new data stream to the intermediate data stream.

6. The image processing apparatus according to claim 1, wherein the filtering by the filter unit includes a process of replacing a specific data stream of the intermediate data stream with another data stream.

7. The image processing apparatus according to claim 1, further comprising a unit constructed to manipulate a process parameter of the filter unit by using a user interface of the interpreter environment.

8. The image processing apparatus according to claim 1, wherein the interpreter environment provides a thread mechanism for the program operating in the interpreter environment and the filter unit performs the filtering autonomously in an independent implementing context of the thread mechanism.

9. The image processing apparatus according to claim 1, wherein the interpreter environment is based on a Java (registered trademark) platform.

10. An image processing apparatus comprising:
a data stream receiving unit constructed to receive an input data stream including a device control designation data stream for giving a control designation to the image processing apparatus and a drawing data stream for giving a drawing designation to the image processing apparatus;
a data processing unit constructed to divide the input data stream into the device control designation data stream and the drawing data stream and to generate an intermediate data stream so as to perform a process according to contents designated by the input data stream;
a filter unit constructed to filter the intermediate data stream and to generate a filtered data stream;
an interface unit constructed to retrieve and write back each of the device control designation data stream and the drawing data stream;
a first selection unit constructed to select a filter function of the filter unit;
a second selection unit constructed to select the device control designation data stream and the drawing data stream to be a subject of the filtering by the filter unit; and
a filter management unit constructed to retrieve the device control designation data stream or the drawing data stream selected by the second selection unit via the interface unit, to transfer the device control designation data stream or the drawing data stream to the filter unit corresponding to the filter function selected by the first selection unit, and to write back the filtered data stream of the device control designation data stream or the drawing data stream via the interface unit.

11. The image processing apparatus according to claim 10, further comprising a transmission unit constructed to transmit the intermediate data stream processed by the filter unit to an information processing apparatus.

12. The image processing apparatus according to claim 10, wherein a client is included in one of an information processing apparatus connected via a network and the image processing apparatus.

13. The image processing apparatus according to claim 10, wherein the filtering by the filter unit includes a process of adding a new data stream to the intermediate data stream.

14. The image processing apparatus according to claim 10, wherein the filtering by the filter unit includes a process of replacing a specific data stream of the intermediate data stream with another data stream.

15. A control method of an image processing apparatus in a native environment constructed based on a first command group processed by a processor configuring hardware and having an interpreter environment for dynamically implementing a program constructed based on a second command group defined independently of the first command group, the method comprising:

- a data stream receiving step of receiving an input data stream including a device control designation data stream for giving a control designation to the image processing apparatus and a drawing data stream for giving a drawing designation to the image processing apparatus in the native environment;
- a data processing step of dividing the input data stream in the native environment into the device control designation data stream and the drawing data stream and generating an intermediate data stream;
- a filter step of filtering the intermediate data stream and generating a filtered data stream in the interpreter environment;
- an interface step of retrieving and writing back each of the device control designation data stream and the drawing data stream in the native environment; and
- a filter management step of transferring each of the device control designation data stream and the drawing data stream of the intermediate data stream retrieved via the interface step in the native environment to a corresponding filter step in the interpreter environment and writing back the filtered data stream of the device control designation data stream and the drawing data stream via the interface step.

16. The control method according to claim 15, further comprising a transmission step of transmitting the intermediate data stream processed by the filter step to an information processing apparatus.

17. The control method according to claim 15, wherein a client is included in one of an information processing apparatus connected via a network and the image processing apparatus.

18. The control method according to claim 15, wherein the intermediate data stream further includes an intermediate image data stream generated by processing the device control designation data stream and the drawing data stream, and a final image data stream generated by processing the intermediate image data stream.

19. The control method according to claim 15, wherein the filtering in the filter step includes a process of adding a new data stream to the intermediate data stream.

20. The control method according to claim 15, wherein the filtering in the filter step includes a process of replacing a specific data stream of the intermediate data stream with another data stream.

21. The control method according to claim 15, further comprising a step of manipulating a process parameter of the filter step by using a user interface of the interpreter environment.

22. The control method according to claim 15, wherein the interpreter environment provides a thread mechanism for the program operating in the interpreter environment and the filter step performs the filtering autonomously in an independent implementing context of the thread mechanism.

23. The control method according to claim 15, wherein the interpreter environment is based on a Java (registered trademark) platform.

24. A control method of an image processing apparatus comprising:

- a data stream receiving step of receiving an input data stream including a device control designation data stream for giving a control designation to the image processing apparatus and a drawing data stream for giving a drawing designation to the image processing apparatus;
- a data processing step of dividing the input data stream into the device control designation data stream and the drawing data stream and generating an intermediate data stream so as to perform a process according to contents designated by the input data stream;
- a filter step of filtering the intermediate data stream and generating a filtered data stream;
- an interface step of retrieving and writing back each of the device control designation data stream and the drawing data;
- a first selection step of selecting a filter function of the filter step;
- a second selection step of selecting the device control designation data stream and the drawing data stream to be a subject of the filtering in said filter step; and
- a filter management step of retrieving the device control designation data stream and the drawing data stream selected in the second selection step via the interface step, transferring the device control designation data stream and the drawing data stream to the filter step corresponding to the filter function selected in the first selection step, and writing back the filtered data stream of the device control designation data stream and the drawing data stream via the interface step.

25. The control method according to claim 24, further comprising a transmission step of transmitting the intermediate data stream processed in the filter step to an information processing apparatus.

26. The control method according to claim 24, wherein a client is included in one of an information processing apparatus connected via a network and the image processing apparatus.

27. The control method according to claim 24, wherein the filtering in the filter step includes a process of adding a new data stream to the intermediate data stream.

28. The control method according to claim 24, wherein the filtering in the filter step includes a process of replacing a specific data stream of the intermediate data stream with another data stream.

29. A data processing apparatus in a first program environment constructed based on a first command group processed by a processor configuring hardware and having a second program environment for dynamically implementing a program constructed based on a second command group defined independently of the first command group, the apparatus comprising:

- a data stream receiving unit constructed to receive an input data stream including a device control designation data stream for giving a control designation to the image processing apparatus and a drawing data stream for giving a drawing designation to the data processing apparatus in the first program environment;
- a data processing unit constructed to divide the input data stream in the first program environment into the device control designation data stream and the drawing data stream and to generate an intermediate data stream;
- a filter unit constructed to filter the intermediate data stream and to generate a filtered data stream in the second program environment;

an interface unit constructed to retrieve and write back the device control designation data stream and the drawing data stream in the first program environment; and a filter management unit constructed to transfer each of the device control designation data stream and the drawing data stream of the intermediate data stream retrieved via the interface unit in the first program environment to corresponding filter unit in the second program environment and to write back the filtered data stream via the interface unit.

30. A data processing apparatus comprising:

a data stream receiving unit constructed to receive an input data stream including a device control designation data stream for giving a control designation to the data processing apparatus and a drawing data stream for giving a drawing designation to the image processing apparatus;

a data processing the unit constructed to divide the input data stream into the device control designation data stream and the drawing data stream and to generate an intermediate data stream so as to perform a process according to contents designated by the input data stream;

a filter unit constructed to filter the intermediate data stream and to generate a filtered data stream;

an interface unit constructed to retrieve and write back each of the device control designation data stream and the drawing data stream;

a first selection unit constructed to select a filter function of the filter unit;

a second selection unit constructed to select the device control designation the data stream and the drawing data stream to be a subject of the filtering by the filter unit; and a filter management unit constructed to retrieve the device control designation data stream or the drawing data stream selected by the second selection unit via the interface unit, to transfer the device control designation data stream or the drawing data stream to the filter unit corresponding to the filter function selected by the first selection unit, and to and write back the filtered data stream of the device control designation data stream or the drawing data stream via the interface unit.

31. An image processing apparatus in a first environment constructed based on a first command group processed by a processor configuring hardware and having an second environment, for dynamically implementing a program constructed based on a second command group defined independently of the first command group, the apparatus comprising:

a data stream receiving unit constructed to receive an input data stream including a device control designation data stream for giving control designation to the image processing apparatus and a drawing data stream for giving a drawing designation to the image processing apparatus in the first environment;

a data processing unit constructed to divide the input data stream in the first environment into the device control designation data stream and the drawing data stream and to generate an intermediate data stream;

a filter unit constructed to filter the intermediate data stream and to generate a filtered data stream in the second environment;

an interface unit constructed to retrieve and write back each of the device control designation data stream and the drawing data stream in the first environment; and a filter management unit constructed to transfer each of the device control designation data stream and the drawing data stream of the intermediate data stream retrieved via the interface unit in the first environment to the filter unit in the second environment, and to write back the filtered data stream via the interface unit.

32. A control method of an image processing apparatus in a first environment constructed based on a first command group processed by a processor configuring hardware and having an second environment for dynamically implementing a program constructed based on a second command group defined independently of the first command group, the method comprising:

a data stream receiving step of receiving an input data stream including a device control designation data stream for giving a control designation to the image processing apparatus and a drawing data stream for giving a drawing designation to the image processing apparatus in the first environment;

a data processing step of dividing the input data stream in the first environment into the device control designation data stream and the drawing data stream and generating an intermediate data stream;

a filter step of filtering the intermediate data stream and generating a filtered data stream in the second environment;

an interface step of retrieving and writing back each of the device control designation data stream and the drawing data stream in the first environment; and a filter management step of transferring each of the device control designation data stream and the drawing data stream of the intermediate data stream retrieved via the interface step in the first environment to a corresponding filter step in the second environment and writing back the filtered data stream via the interface step.

* * * * *